United States Patent
Wei et al.

(10) Patent No.: US 10,320,063 B2
(45) Date of Patent: Jun. 11, 2019

(54) METHODS FOR SLOT ANTENNA DESIGN FOR WEARABLE ELECTRONIC DEVICES AND CONDUCTIVE HOUSINGS

(71) Applicant: Fitbit, Inc., San Francisco, CA (US)

(72) Inventors: Yonghua Wei, San Diego, CA (US); Kevin Li, San Diego, CA (US); Patrick James Markan, San Francisco, CA (US); Allen Yu-Li Wang, Mountain View, CA (US); Teemu Taneli Raafael Kaiponen, San Diego, CA (US); Christos Kinezos Ioannou, San Diego, CA (US)

(73) Assignee: Fitbit, Inc., San Francisco, CA (US)

( * ) Notice: Subject to any disclaimer, the term of this patent is extended or adjusted under 35 U.S.C. 154(b) by 0 days.

(21) Appl. No.: 15/842,689

(22) Filed: Dec. 14, 2017

(65) Prior Publication Data

US 2018/0166772 A1  Jun. 14, 2018

Related U.S. Application Data

(60) Provisional application No. 62/433,994, filed on Dec. 14, 2016.

(51) Int. Cl.
*H01Q 1/24* (2006.01)
*H01Q 1/27* (2006.01)
(Continued)

(52) U.S. Cl.
CPC .............. *H01Q 1/273* (2013.01); *H01Q 1/22* (2013.01); *H01Q 1/2266* (2013.01); *H01Q 1/27* (2013.01);
(Continued)

(58) Field of Classification Search
CPC .......... H01Q 1/243; H01Q 21/30; H01Q 9/42; H01Q 7/00; H01Q 1/24; H01Q 1/273; H01Q 1/2266; H01Q 1/38; H01Q 13/10
See application file for complete search history.

(56) References Cited

U.S. PATENT DOCUMENTS

| | | | |
|---|---|---|---|
| 4,091,318 A * | 5/1978 | Eichler ................. | H02G 11/02 191/12.2 R |
| 7,876,274 B2 * | 1/2011 | Hobson ................. | H01Q 1/243 343/702 |

(Continued)

OTHER PUBLICATIONS

International Search Report and Written Opinion dated May 1, 2018 in PCT/US17/66494.

*Primary Examiner* — Tho G Phan
(74) *Attorney, Agent, or Firm* — Weaver Austin Villeneuve & Sampson LLP

(57) ABSTRACT

A wearable computing device can include a monopole-excited slot antenna formed by a gap between a housing (such as a highly conductive housing) and a bracket (such as a highly conductive bracket) within the highly conductive housing and by a back cavity between the highly conductive bracket and the PCB. The antenna configuration can include a monopole antenna electrically coupled to a printed circuit board and a slot antenna that is excited through coupled electromagnetic fields. The highly conductive bracket is positioned near a display window of the device, mostly below and partially enclosing a battery. The highly conductive bracket is positioned above the printed circuit board. This configuration allows for a relatively small dead band in the display window, a larger battery, compact and mechanically simple configuration, and superior water resistance.

20 Claims, 24 Drawing Sheets

(51) Int. Cl.
  *H01Q 1/22* (2006.01)
  *H01Q 1/38* (2006.01)
  *H01Q 13/10* (2006.01)
  *H02J 7/02* (2016.01)
  *H01Q 1/48* (2006.01)

(52) U.S. Cl.
  CPC ............... *H01Q 1/38* (2013.01); *H01Q 13/10* (2013.01); *H02J 7/02* (2013.01); *H01Q 1/48* (2013.01)

(56) References Cited

U.S. PATENT DOCUMENTS

| | | | |
|---|---|---|---|
| 8,106,836 B2 * | 1/2012 | Hill | H01Q 1/243 343/700 MS |
| 8,693,204 B2 * | 4/2014 | Malek | G01C 17/28 361/752 |
| 9,196,964 B2 | 11/2015 | Baringer | |
| 9,379,427 B2 * | 6/2016 | Xu | H01Q 1/243 |
| 9,520,638 B2 | 12/2016 | Baringer et al. | |
| 9,543,636 B2 | 1/2017 | Baringer et al. | |
| 9,660,324 B2 | 5/2017 | Baringer | |
| 9,680,205 B2 * | 6/2017 | Li | H01Q 1/243 |
| 9,865,915 B2 * | 1/2018 | Shiu | H01Q 1/24 |
| 9,876,273 B2 * | 1/2018 | Lui | H01Q 1/243 |
| 2009/0021439 A1 | 1/2009 | Kanno et al. | |
| 2011/0012794 A1 | 1/2011 | Schlub et al. | |
| 2012/0169547 A1 | 7/2012 | Oh et al. | |
| 2014/0071634 A1 | 3/2014 | Pakula et al. | |
| 2014/0256377 A1 | 9/2014 | Sai Ananthanarayanan | |
| 2014/0266938 A1 | 9/2014 | Ouyang et al. | |
| 2014/0266939 A1 | 9/2014 | Baringer et al. | |
| 2017/0084983 A1 | 3/2017 | Baringer et al. | |

\* cited by examiner

METHODS FOR SLOT ANTENNA DESIGN FOR WEARABLE ELECTRONIC DEVICES AND CONDUCTIVE HOUSINGS

CROSS-REFERENCE TO RELATED APPLICATION(S)

The present disclosure relates to U.S. Patent Publication No. 2014/0266939, entitled "Hybrid Radio Frequency/Inductive Loop Antenna," filed May 29, 2014 and published Sep. 18, 2014, the entire contents of which is hereby incorporated by reference herein to form a part of this specification for all purposes (and included as an Appendix to this specification).

This application claims the benefit of U.S. Provisional Patent Application No. 62/433,994, filed on Dec. 14, 2016, which is hereby incorporated by reference in its entirety for all purposes.

BACKGROUND

Field

The present disclosure generally relates to the field of wearable electronic devices and more particularly to antennas for wearable electronic devices.

Description of Related Art

Modern electronic devices frequently include one or more radio-frequency antennas to facilitate wireless communication with other electronic devices. For example, in small wearable electronic devices, the antennas may be configured to fit within a restricted envelope while still providing desirable emission and reception characteristics.

BRIEF DESCRIPTION OF THE DRAWINGS

Various embodiments are depicted in the accompanying drawings for illustrative purposes, and should in no way be interpreted as limiting the scope of the inventions. In addition, various features of different disclosed embodiments can be combined to form additional embodiments, which are part of this disclosure. Throughout the drawings, reference numbers may be reused to indicate correspondence between reference elements.

DETAILED DESCRIPTION

Figure 1:
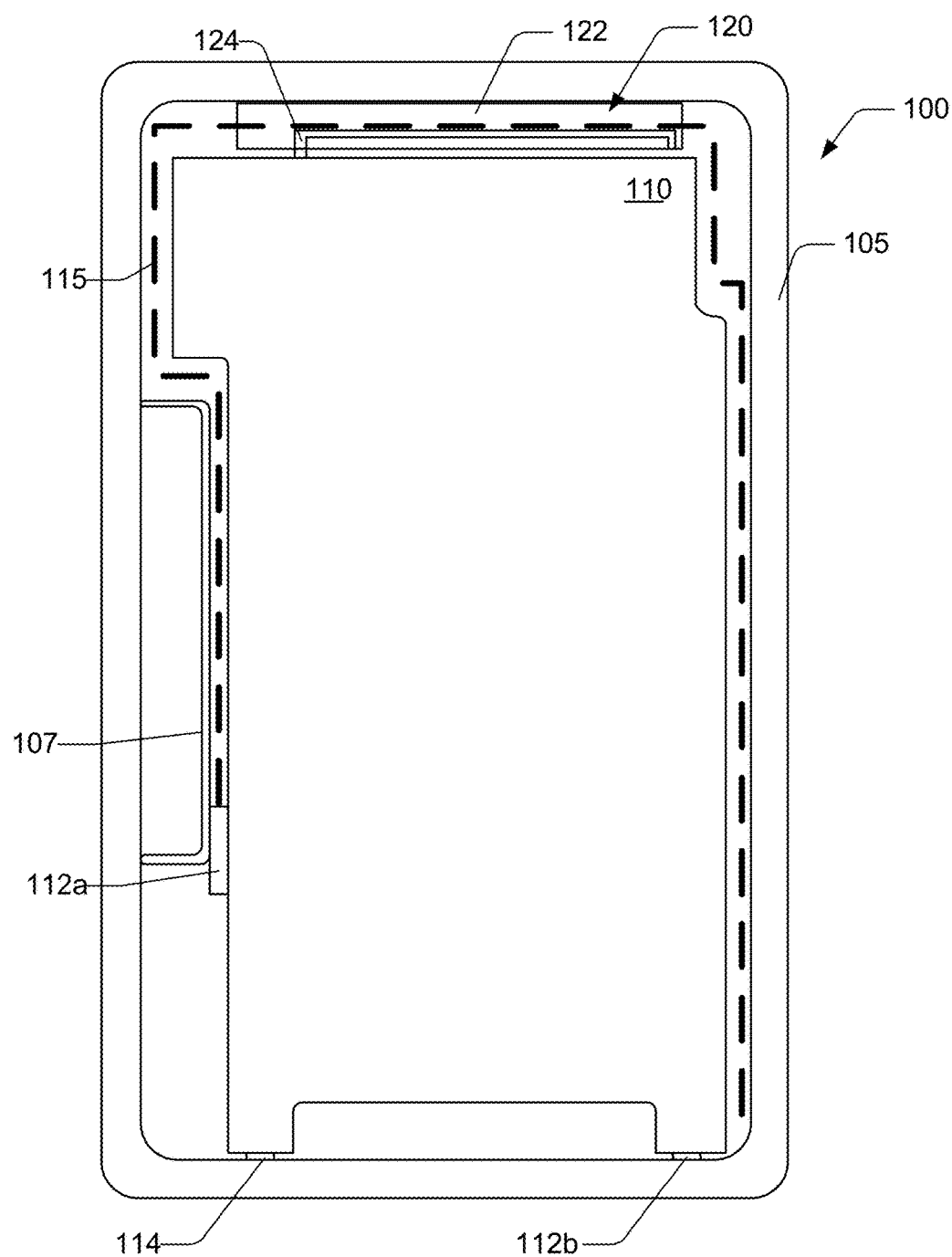
FIG. 1 illustrates a top view of an example wearable electronic device having a metal plate within a metal housing forming a slot antenna that is excited by a monopole antenna.

The headings provided herein are for convenience only and do not necessarily affect the scope or meaning of the claimed inventions. Like reference numbers and designations in the various drawings may or may not indicate like elements.

Although certain preferred embodiments and examples are disclosed below, inventive subject matter extends beyond the specifically disclosed embodiments to other alternative embodiments and/or uses and to modifications and equivalents thereof. Thus, the scope of the claims that may arise here from is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Overview

Biometric monitoring devices, including wrist-worn biometric monitoring devices, can be configured to send and receive biometric and other data to and from one or more separate electronic devices. To wirelessly send and receive data, such monitoring devices require the use of one or more antennas in the device. This may present a variety of problems. For example, an antenna may require dead bands, or non-active areas, in a display window. The antenna may occupy significant space within the metal (and/or conductive) housing, or may result in a configuration of components, that reduces the size of a power source, power cell, and/or battery, thereby reducing battery life of the device. Some antennas may be at least partially located outside of the metal housing making it difficult, costly, or otherwise impractical to make the device water resistant or swim proof. Some antenna designs exert an upward or outward force on the display window, causing the display window to separate from the metal housing over time, which may cause the device to become no longer water resistant and/or swim proof. Finally, some antenna designs may be undesirably mechanically complex and/or costly. Accordingly, disclosed herein are embodiments of wearable devices and biometric monitoring devices having a monopole-excited slot antenna design that addresses one or more of the above issues.

Disclosed herein are antenna architectures for wearable electronic devices. The disclosed antenna architectures include two portions. First, the antenna architectures include a monopole antenna having a monopole radiator on a plastic carrier implemented at a top of a display area within a metal housing of the device. The monopole radiator is connected through an antenna clip on a printed circuit board (PCB) to a radio frequency (RF) engine. The monopole antenna can be implemented as a flex film antenna radiator assembled on, for example, a plastic carrier. The monopole radiator can generate electromagnetic fields to induce the slot antenna to transmit or receive radio frequency signals.

The antenna can be designed to be particularly receptive to (or emissive of) radio frequency energy at frequencies within the frequency band(s) for the wireless communications protocol(s) that the antenna is designed to support, and the antenna can also be designed to not be particularly receptive to (or emissive of) radio frequency energy at frequencies outside of the frequency band(s). Antennas may achieve such selectivity by virtue of their physical geometry and the dimensions that define that geometry.

Second, the antenna architectures include a slot antenna formed by a gap between a metal (and/or conductive) plate and the metal housing. The slot antenna radiates RF signals from the slot structure through a display module, a touch module, and a glass window. The monopole radiator and slot antenna are capacitively coupled such that the monopole radiator generates a varying electric field that induces varying electric fields at the slot antenna, resulting in the emission of RF signals. This coupling of electric fields between the monopole radiator and the slot antenna allows for RF signals to be transmitted from and received by the device. The monopole radiator is positioned within the slot area to excite the slot antenna through electromagnetic field coupling. The dimensions of the slot antenna and monopole antenna can be tuned to achieve targeted communication frequency bands. Furthermore, the monopole antenna portion can be tuned to have a certain length and a matching circuit on the PCB may be utilized to tune the antenna impedance to achieve targeted performance characteristics. In some embodiments, the metal plate and/or metal housing can be conductive. The metal plate and/or metal housing can include one or more materials that include a conductivity of 1E5 Siemens/m and/or higher.

In some embodiments, the disclosed monopole-excited slot antennas reduce the dead band of the display window or provide a desirably or advantageously small dead band at a top of the display window. The monopole antenna component that excites the slot antenna can provide a targeted excitation for the slot antenna with a reduced distance between a top side of the metal housing and a display module relative to a pure monopole antenna or inverted-F antenna (IFA) architecture with similar antenna performance.

In some embodiments, the disclosed monopole-excited slot antennas accommodate a device architecture having a printed circuit board (PCB) mounted close to the bottom of a metal housing. For tapered metal housings, this allows a relatively large battery to be placed above the PCB and within the metal housing. In contrast, devices with similar tapered metal housings employing other antenna designs may require the PCB to be mounted above the battery to achieve suitable performance, manufacturing costs, and/or mechanical complexity. In such devices, the battery size is reduced relative to devices that incorporate the antenna architectures disclosed herein that allow the battery to be placed above the PCB.

In some embodiments, the disclosed monopole-excited slot antenna designs reside entirely within the metal housing. Advantageously, this facilitates manufacturing the device to be water resistant and/or swim proof. Where at least some portion of the antenna is exterior to the metal housing, vias or holes in the metal housing may be required to send and receive electrical signals to the portion of the antenna outside of the metal housing. These vias or holes may compromise any water-tight capabilities of the device or may undesirably increase the cost of making such a device water resistant and/or swim proof.

In some embodiments, the disclosed monopole-excited slot antenna designs exert no contact pressure force on the glass window. Advantageously, this facilitates manufacturing the device to be water resistant and/or swim proof, creating water-tight seals for junctions between components. Where an antenna exerts an outward force on the display window, for example, the display window may tend to separate from the metal housing, compromising the water-tight seal.

The disclosed monopole-excited slot antennas function by using a capacitively-coupled monopole antenna radiator to excite an antenna slot. Relative to a device that uses a slot antenna with a direct feed from a PCB to excite the slot antenna, the disclosed antenna design may be advantageous due at least in part to being mechanically simpler (e.g., not requiring the using of a coaxial cable or other transmission line from the PCB to the antenna) resulting in a lower cost and increased ease of manufacture.

The various implementations discussed herein may be used, for example, to provide a monopole-excited slot antenna that provides BLUETOOTH® functionality, including BLUETOOTH Low Energy (Bluetooth LE or BTLE) functionality. Such a compact and efficient antenna may be of particular use in highly-integrated devices having a small form factor. For example, the disclosed antennas can be used in biometric monitoring devices, e.g., wearable devices that track, report, and communicate various biometric measurements, e.g., distance traveled, steps taken, flights of stairs climbed, etc. Such devices may take the form of a small device that is clipped to a person's clothing or worn on a person's wrist. Such a device may, for example, contain various processors, printed circuit boards, sensors, triaxial accelerometers, triaxial gyroscopes, an altimeter, a display, a vibramotor, a rechargeable battery, a recharging connector, and an input button all within a metal housing that measures approximately between 1.62" and 2" in length, 0.75" and 0.85" in width, and 0.3" and 0.44" in thickness. A monopole-excited slot antenna may be used in such a device to provide RF communication in a water resistant and/or swim-proof wearable device, to reduce the dead band of a display window, and/or to provide a more cost-efficient and mechanically simple device.

Due to the small size of such devices, monopole-excited slot antennas, such as those disclosed herein, may provide the ability to offer a more compact communications solution than might otherwise be possible, allowing additional volume within the metal housing to be made available for other purposes, such as a larger battery. Such dimensions may prove to be particularly well-suited to RF communications in the BLUETOOTH® wireless protocol bands, e.g., 2402 MHz to 2480 MHz.

Monopole-excited slot antenna antennas that support other wireless communications protocols may also be designed using the principles outlined herein. For example, the disclosed antenna architectures may be configured or dimensioned to be suitable for use with wireless networks and radio technologies, such as wireless wide area network (WWAN) (e.g., cellular) and/or wireless local area network (WLAN) carriers. Examples of such wireless networks and radio technologies include but are not limited to Long Term Evolution (LTE) frequency bands or other cellular communications protocol bands, GPS (Global Positioning System) or GNSS (Global Navigation Satellite System) frequency bands, ANT™, 802.11, and ZigBee™, for example, as well as frequency bands associated with other communications standards. The RF radiator size, gaps between components, and other parameters discussed herein may be adjusted as needed in order to produce a monopole-excited slot antenna, as described herein, that is compatible with such other frequency bands.

Biometric Monitoring

In some implementations, the present disclosure is related to antenna configurations for biometric monitoring devices. The term "biometric monitoring device" is used herein according to its broad and ordinary meaning, and may be used in various contexts herein to refer to any type of biometric tracking devices, personal health monitoring devices, portable monitoring devices, portable biometric monitoring devices, or the like. In some embodiments, biometric monitoring devices in accordance with the present disclosure may be wearable devices, such as may be designed to be worn (e.g., continuously) by a person (i.e., "user," "wearer," etc.). When worn, such biometric monitoring devices may be configured to gather data regarding activities performed by the wearer, or regarding the wearer's physiological state. Such data may include data representative of the ambient environment around the wearer or the wearer's interaction with the environment. For example, the data may comprise motion data regarding the wearer's movements, ambient light, ambient noise, air quality, etc., and/or physiological data obtained by measuring various physiological characteristics of the wearer, such as heart rate, perspiration levels, and the like.

In some cases, a biometric monitoring device may leverage other devices external to the biometric monitoring device, such as an external heart rate monitor in the form of an EKG sensor for obtaining heart rate data, or a GPS or GNSS receiver in a smartphone may be used to obtain position data, for example. In such cases, the biometric monitoring device may communicate with these external devices using wired or wireless communications connections. The concepts disclosed and discussed herein may be applied to both stand-alone biometric monitoring devices as well as biometric monitoring devices that leverage sensors or functionality provided in external devices, e.g., external sensors, sensors or functionality provided by smartphones, etc.

Example Wearable Electronic Devices with Monopole-Excited Slot Antenna

FIG. 1 illustrates a top view of an example wearable electronic device 100 having a metal plate 110 within a metal housing 105 forming a slot antenna 115 that is excited by a monopole antenna 120. The housing (such as a metal housing) 105 may be designed to accommodate a display that will be worn on a person's wrist. A wristband (not shown) may be connected to the opposing ends of the metal housing 105, and the completed unit may be worn on someone's wrist. The metal housing 105 may be designed to conform better to the cross-sectional curvature of a person's forearm and the interior of the metal housing may be occupied by various electrical components, including a PCB or FPCB (Flexible Printed Circuit Board) that includes, for example, various sensors, processors, power management components, etc. The metal housing 105 may include additional features, such as a metal button bracket 107, to support other elements within the metal housing 105.

The slot antenna 115 is structured as a gap between the metal plate 110 and the metal housing 105 (including the metal button bracket 107) stopped at two ends with grounding contacts 112a, 112b between the metal plate 110 and the metal housing 105. The gap between the metal plate 110 and the metal housing 105, running between the grounding contacts 112a, 112b, forms the slot antenna 115 that, when excited by the monopole antenna 120, radiates or receives RF signals. The slot antenna 115 can be configured as a half-wavelength slot antenna (e.g., a length of about 6.25 cm for BLUETOOTH® communication). The slot antenna 115 is not directly driven by any element (e.g., an antenna feed or coaxial cable) coupled to the printed circuit board or other similar component.

The slot antenna 115 includes two slot antenna groundings 112a, 112b between the metal plate 110 and the metal housing 105. A third grounding pin 114 can be included to improve performance. The groundings 112a, 112b can be used to tune the slot resonance of the slot antenna (e.g., to resonate within the BLUETOOTH® band). The third grounding pin 114 can be used for reducing or preventing unwanted resonances in the remaining gap between the metal housing 105 and the metal plate 110 that may reduce the radiation efficiency of the slot antenna 115. The grounding clips 112a, 112b, 114 can be configured as a spring contact or other type of electrical connection. The grounding clips 112a, 112b, 114 can include elements that terminate in a leaf spring that presses against the metal housing 105 or metal button bracket 107.

The monopole antenna 120 is designed to excite the slot antenna 115 in a targeted mode. The monopole antenna 120 includes a flex antenna as the monopole radiator 124 on a monopole antenna carrier 122 made of a plastic mechanical component. The flex antenna 124 is assembled on the surface of the carrier 122 and the carrier 122 is placed inside the metal housing 105. The carrier 122 can be attached to the metal housing 105 or other component of the device 100.

Figure 2:
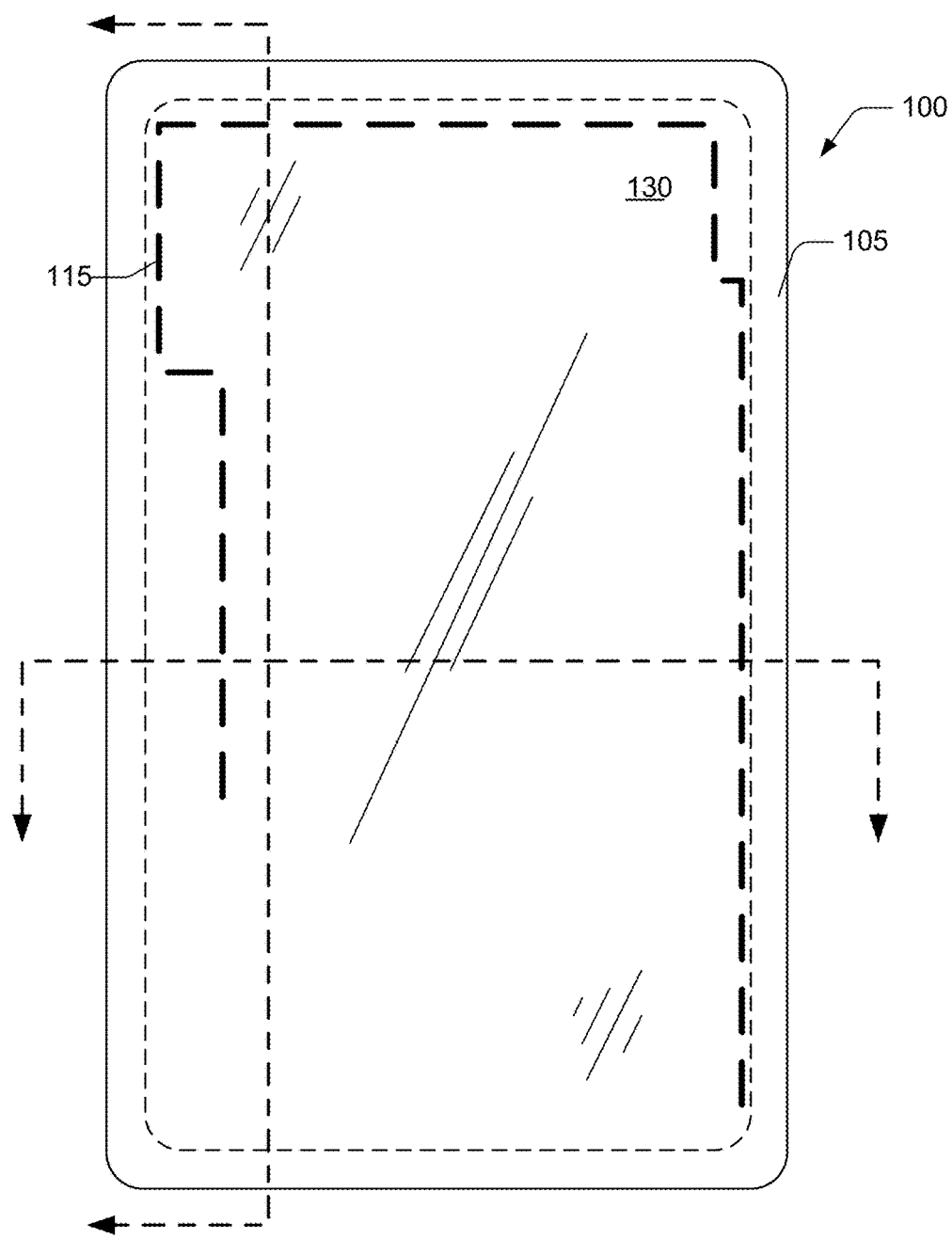
FIG. 2 illustrates a top view of the wearable electronic device of FIG. 1 with a display shown and the relative position of the slot antenna under the window.

FIG. 2 illustrates a top view of the wearable electronic device 100 of FIG. 1 with a display window 130. In FIG. 1, the display window 130 was not shown to illustrate more clearly the configuration of the metal plate 110 and monopole antenna 120. In FIG. 2, the display window 130 is shown to demonstrate the relative position of the slot antenna 115 under the display window 130. The slot antenna 115 is located below the display window 130 and radiates through the window 130. In some embodiments, and merely by way of example, the display window 130 can be, according to some embodiments, between about 0.65"×1.05" (16.5 mm×26.6 mm) to about 0.77"×1.28" (19.6 mm×32.6 mm).

Figure 3:
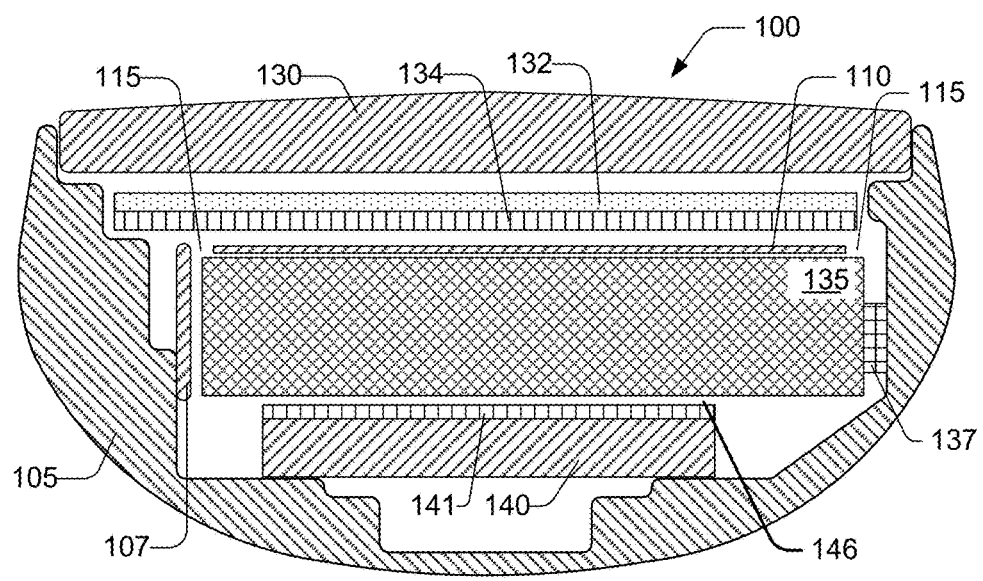
FIG. 3 illustrates a cross-section of the wearable electronic device of FIG. 1 taken along a width of the wearable electronic device.
Figure 4:
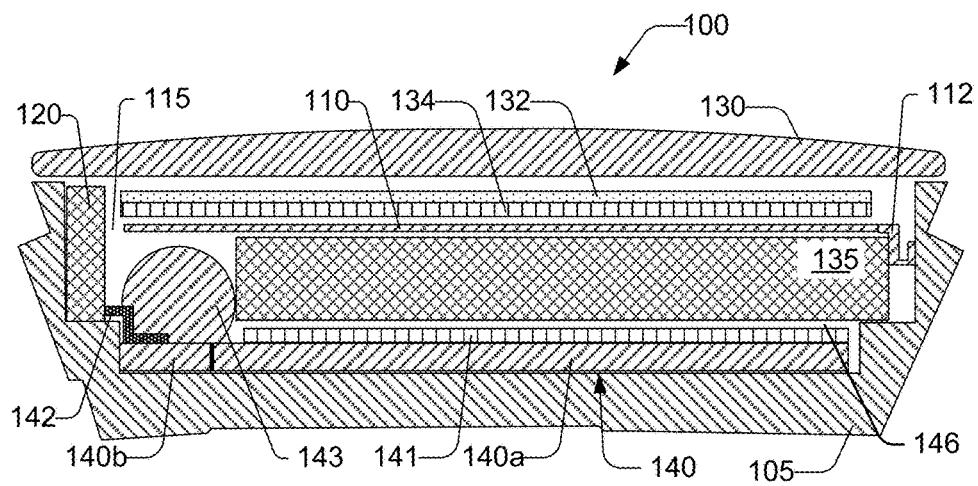
FIG. 4 illustrates a cross-section of the wearable electronic device of FIG. 1 taken along a length of the wearable electronic device.

FIGS. 3 and 4 illustrate cross-sections of the wearable electronic device 100 of FIG. 1 taken along a width of the wearable electronic device (FIG. 3) and a length of the wearable electronic device (FIG. 4), as indicated in FIG. 2. The cut-away view shows the relative positions of certain components within the metal housing 105. It is to be understood that more or fewer components can be used and their arrangement can be different from that illustrated here. It is also to be understood that the figure is not to scale and the distances in the figure do not represent actual distances in any particular embodiment.

The device 100 includes a display window 130 mechanically coupled to the metal housing 105. In some embodiments, the display window 130 and the metal housing 105 form a sealed enclosure that is water resistant and/or swim proof. The device 100 includes a touch module 132 and a display module 134. The touch module 132 is configured to detect touch input on the display window 130. The display module 134 is configured to display images or information through the display window 130.

Below the touch and display modules 132, 134, the metal plate 110 is positioned within the metal housing 105 to form the slot antenna 115 (represented by the gaps between the metal housing 105 or metal button bracket 107 and the metal plate 110). The metal plate 110 can be electrically coupled (e.g., grounded) to the metal housing 105 through grounding pin 112. It is to be understood that the number of grounding pins can vary depending on targeted performance characteristics. For example, the number of grounding pins can be at least 2, at least 3, at least 4, at least 5, and so forth.

Below the metal plate 110 is positioned the battery 135. The battery 135 can be secured within the metal housing 105 to maintain its relative position within the metal housing 105. For example, a spacer 137 can be used to maintain a separation between the battery 135 and the metal housing 105.

Below the battery 135 is positioned a component layer 141 on a PCB 140. The component layer 141 can include microprocessors, RAM (random access memory), ROM (read only memory), ASICs (application specific integrated circuit), FPGAs (field programmable gate array), surface mounted elements, integrated circuits, and the like. The PCB 140 provides electrical components and circuitry that directs and interprets electrical signals for the device 100. For example, the PCB 140 is electrically coupled to the display and touch modules 132, 134 to interpret touch input and to provide images or information to display. The PCB 140 is coupled to an antenna feed clip 142 that is electrically coupled to the monopole antenna 120. The PCB 140 can include a ground plane area 140a that forms a ground plane for the monopole antenna 120. The PCB 140 can include a feed clip area 140b that does not include conductive elements other than where the antenna feed clip 142 is mounted on and electrically coupled to the PCB 140. For example, the PCB 140 can include a trace that electrically couples the ground plane area 140a to the feed clip area 140b, the feed clip 142 being electrically coupled to the trace in the feed clip area 140b. The ground plane for the monopole antenna 120 may be provided by a large metalized area, conductive traces in a printed circuit board (e.g., the PCB 140) or flexible printed circuit board, a metal plate and/or surface within the metal housing 105, etc. The device 100 can also include a vibrating motor 143 to provide haptic feedback or to otherwise mechanically vibrate the device 100. The PCB 140 can be grounded to the metal housing 105 through one or more grounding screws that electrically couple the PCB 140 to the metal housing 105.

The battery 135 can be about 0.05 mm below the metal plate 110. In some embodiments, a layer of a non-conductive, low RF loss, rigid material may be inserted to fit in the 0.05 mm gap to attach or otherwise mechanically couple the metal plate 110 to the battery 135. In some embodiments, the battery 135 is between about 0.01 mm and about 0.1 mm below the metal plate 110, between about 0.03 mm and about 0.7 mm below the metal plate 110, or between about 0.04 mm and about 0.06 mm below the metal plate 110.

Between the battery 135 and component layer 141, there is a dielectric gap (e.g. air or plastic or combination of air and plastic) 146 which creates a back cavity for the slot antenna within an enclosed metal housing design. The dielectric gap may vary in height, but must insure isolation between the battery 135 to any component on the component layer 141. The battery 135 can be about 0.48 mm above the component layer 141. In some embodiments, the battery 135 is between about 0.4 mm and about 0.6 mm above the component layer 141, between about 0.42 mm and about 0.55 mm above the component layer 141, or between about 0.45 mm and about 0.5 mm above component layer 141. In some embodiments, as described herein, a plastic bracket can be placed in this gap to support the battery 135 above the component layer 141 of the PCB 140.

The battery 135 can be about 0.53 mm from the right side of the metal housing 105 (e.g., as shown in FIG. 3). In some embodiments, the battery 135 is between about 0.4 mm and about 0.6 mm from the right side of the metal housing 105, between about 0.45 mm and about 0.58 mm from the right side of the metal housing 105, or between about 0.5 mm and about 0.55 mm from the right side of the metal housing 105.

The battery 135 can be about 0.95 mm from the bottom side of the metal housing 105 (e.g., the right side of FIG. 4). In some embodiments, the battery 135 is between about 0.8 mm and about 1.2 mm from the bottom side of the metal housing 105, between about 0.85 mm and about 1.1 mm from the bottom side of the metal housing 105, or between about 0.9 mm and about 1.0 mm from the bottom side of the metal housing 105.

The battery 135 can be about 0.33 mm from the metal button bracket 107 (e.g., as shown in FIG. 3). In some embodiments, the battery 135 is between about 0.2 mm and about 0.45 mm from the metal button bracket 107, between about 0.25 mm and about 0.4 mm from the metal button bracket 107, or between about 0.3 mm and about 0.35 mm from the metal button bracket 107.

The battery 135 can be about 3.2 mm thick. In some embodiments, the battery 135 can be between about 2.5 mm and about 4 mm thick, between about 2.75 mm and about 3.75 mm thick, or between about 3 mm and about 3.5 mm thick. Although particular values for certain device geometries have been provided, it is to be understood that these dimensions can be changed relative to the size of the metal housing 105.

As described herein, the disclosed monopole-excited slot antenna configurations provide a number of advantages, especially when implemented in wearable devices such as biometric monitoring devices. To illustrate one or more advantages, comparison can be made to other antenna configurations. For example, a device having a single monopole or IFA (inverted "F" antenna) antenna design can achieve similar performance by increasing the dead band at the top of the display window. This is undesirable as it detracts from the design and utility of the device. Accordingly, the disclosed antenna design provides reduced dead bands relative to monopole or IFA antenna configurations that provide comparable antenna performance (e.g., transmission and reception strength). In some embodiments, the slot antenna is not directly excited by an antenna feed physically coupled to the PCB.

Another alternative configuration includes a slot antenna that is directly fed from the PCB rather than being coupled to a monopole antenna, with the PCB being placed above the battery. In devices with tapered cross-sections, this may undesirably reduce the size of the battery.

Another alternative configuration includes a slot antenna that is directly fed from the PCB rather than being coupled to a monopole antenna, with the PCB below the battery. This would require the use of a feed line (e.g., coaxial cable) from the PCB to the metal plate 110 or metal housing 105 near the metal plate 110 to excite the fields between the metal housing 105 and the metal plate 110. Using a coaxial cable complicates the mechanical implementation and increases the cost of the device. Furthermore, the disclosed antenna architectures can be configured to achieve similar performance characteristics as an elevated feed design using a coaxial cable.

Another alternative configuration includes a monopole or IFA antenna outside the metal housing 105. One drawback of this design is the introduction of additional mechanical complexity and added difficulties in achieving a device that is water resistant and/or swim proof. The antenna feed would typically connect the PCB inside the metal housing 105 to the antenna located outside the metal housing 105. Accordingly, the disclosed antenna architectures can be housed entirely within the metal housing 105 to facilitate water resistance of the device 100.

Figure 5:
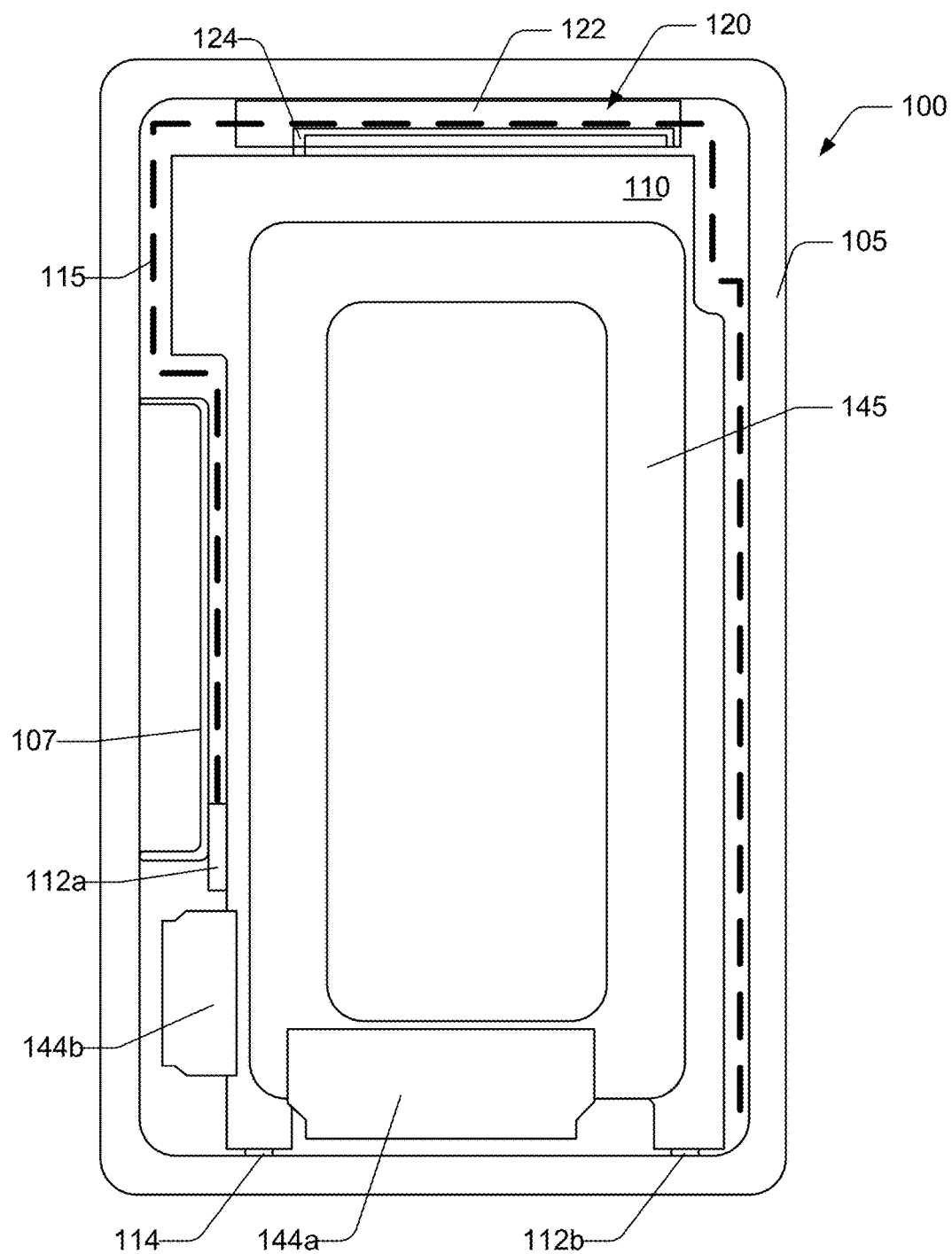
FIG. 5 illustrates a top view of the wearable electronic device of FIG. 1 with an NFC (Near Field Communication) antenna on top of the metal plate.

FIG. 5 illustrates a top view of the wearable electronic device 100 of FIG. 1 with an NFC antenna 145 on top of the metal plate 110. The monopole-excited slot antenna 114 can be configured to operate in a way that allows the NFC antenna 145 to continue to operate and may operate with comparable performance. In some embodiments, the NFC antenna 145 can be about 25.6 mm×12.8 mm. The NFC antenna 145 can be positioned about 1 mm from the slot antenna 115. The device 100 can also include a first flex cable 144a configured to couple to one or more modules (e.g., the touch module 132 or the display module 134) and a second flex cable 144b configured to couple to the battery 135 and/or to the NFC antenna 145. It is to be understood that the number of flex cables can vary and may be at least 1 flex cable, at least 2 flex cables, at least 3 flex cables, and so forth. It is also to be understood that one or more of the flex cables may be replaced with one or more wires. For example, wires can couple to the battery 135 and/or the NFC antenna 145.

Figure 6:
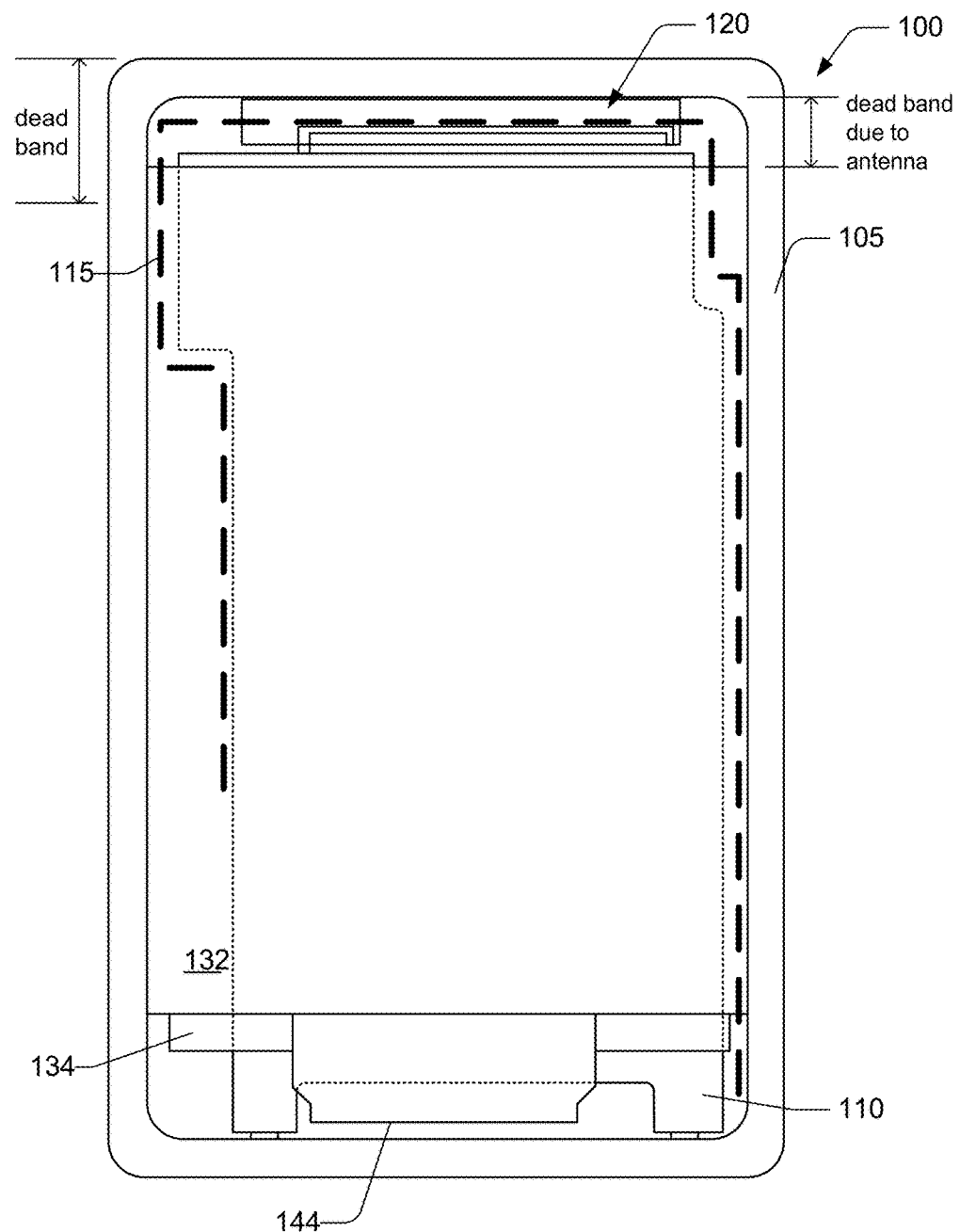
FIG. 6 illustrates a top view of the wearable electronic device of FIG. 1 with a display module and a touch module shown on top of the metal plate to illustrate a dead band on the side of the display closest to the monopole antenna with the disclosed antenna configuration.

FIG. 6 illustrates a top view of the wearable electronic device 100 of FIG. 1 with a display module 134 and a touch module 132 shown on top of the metal plate 110 to illustrate a dead band of the display window with the disclosed antenna configuration. As used herein, the dead band of the display is considered to be the non-active area of the display window or where the display module 134 does not display information through the display window. Accordingly, as illustrated in FIG. 6, the dead band of the display window extends from an edge of the display window (shown here as coinciding with an exterior edge of the metal housing 105) to a point beyond the edge of the display module 134. It should be understood that the display window can extend beyond the metal housing 105 or it can be configured to not extend to the edge of the metal housing 105. The distance from the edge of the display module 134 to an active region of the display module 134 contributes to the dead band of the display window and can be about 1 mm in length. As described herein, the RF signal from the slot antenna 115 is radiated through the gap between the metal housing 105 and the edges of the display module 134 and the touch module 132. The monopole antenna 120 has a clearance at the top of the device 100 of about 2 mm from the interior of the metal housing 105 to the edge of the display module 134, contributing about 2 mm to the total dead band. The contribution to the dead band, or the increase in the dead band relative to a device where the display module is flush with an interior wall of the metal housing 105, can be between about 1 mm and about 3 mm, between about 1.5 mm and about 2.5 mm, or between about 1.75 mm and about 2.25 mm. Thus, in some embodiments, the dead band of the display window can be less than or equal to about 6 mm, less than or equal to about 5 mm, less than or equal to about 4.5 mm, or less than or equal to about 4 mm. In some embodiments, the dead band of the display overlaps with the dead band of the monopole antenna. In some embodiments, the dead band of the display and the dead band of the monopole antenna include a space between an interior surface of the metal housing 105 and an edge of the metal plate 110.

As described herein, an alternative antenna design is to include a monopole, IFA, or loop antenna placed at the top of the display area. However, to achieve similar performance, simulations indicate that the contribution to the dead band of the display window by the antenna would have to be increased to about 4.8 mm from about 2 mm. Accordingly, the disclosed antenna architectures provide desirable or advantageous performance with a relatively small dead band compared to a pure monopole, IFA, or loop antenna implementation.

Figure 7:
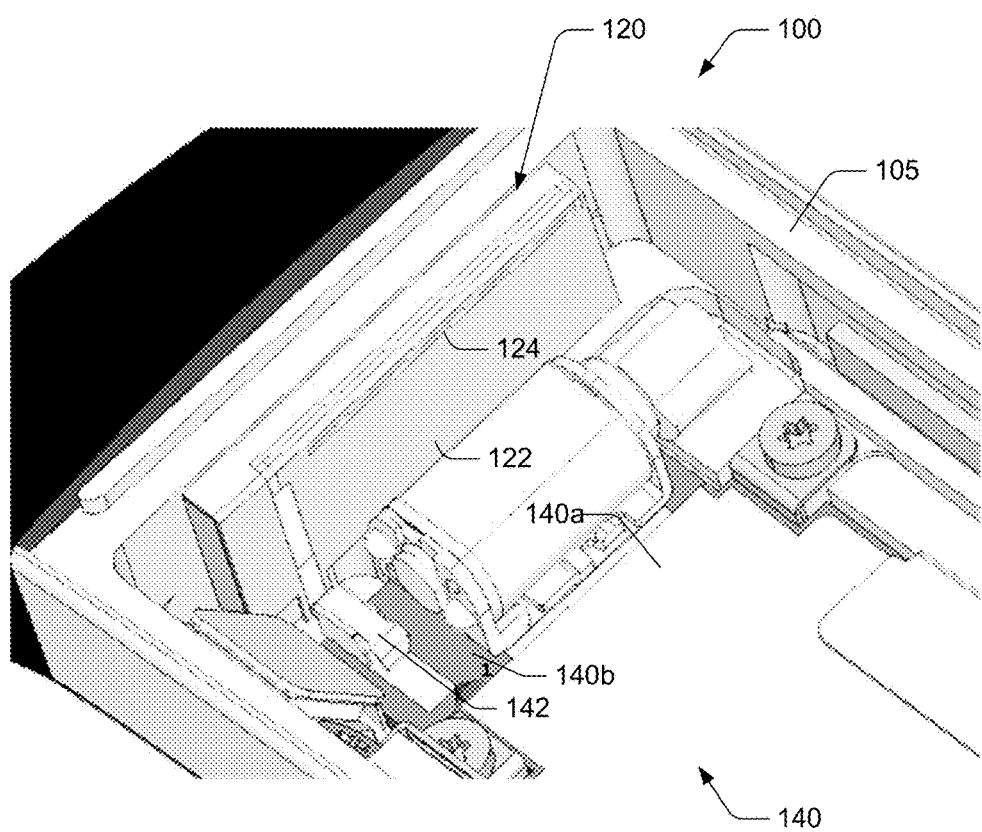
FIGS. 7-9 illustrate various views of a printed circuit board having a feed clip coupled to a monopole antenna to drive a slot antenna.
Figure 8:
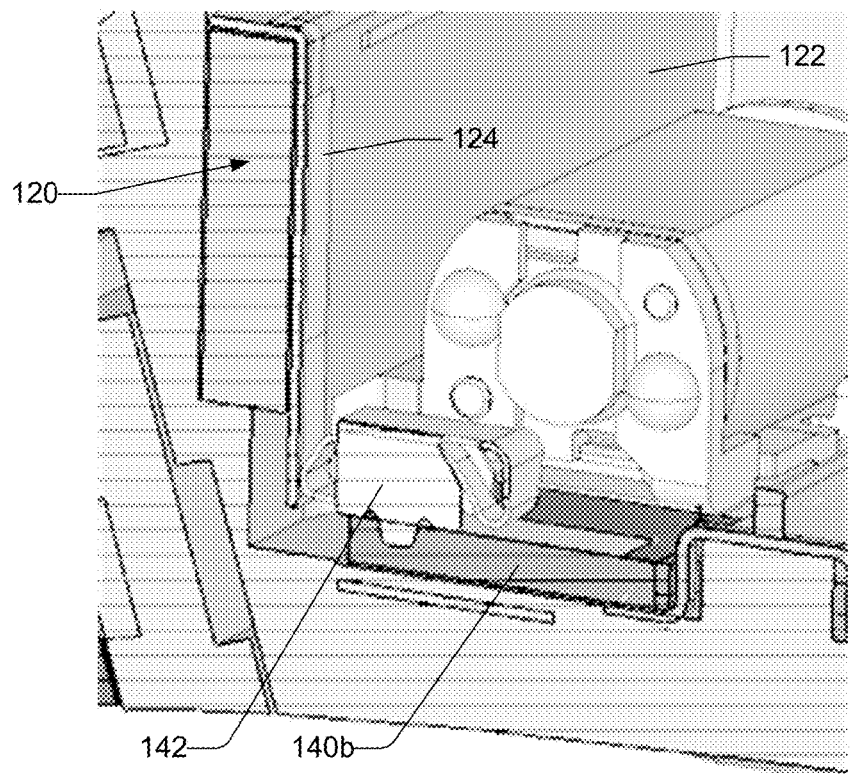
Figure 9:
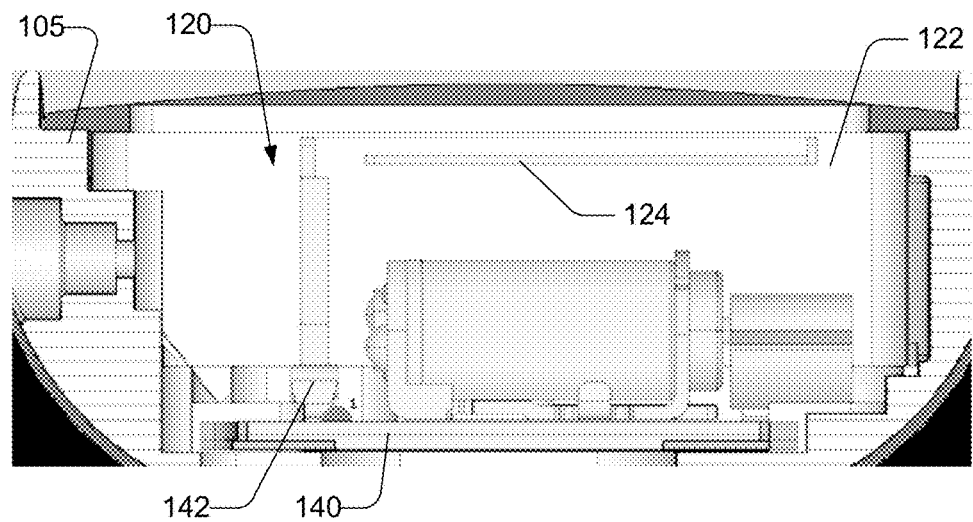

FIGS. 7-9 illustrate various views of a printed circuit board 140 having a feed clip 142 coupled to a monopole antenna 120 to drive a slot antenna. The feed clip 142 is coupled to a monopole radiator 124 to selectively drive the radiator so that it excites the slot antenna to radiate at targeted frequencies. The feed clip 142 provides an electrically conductive path for receiving or sending electrical signals via the monopole-excited slot antenna in response to received RF radiation or produced in the monopole-excited slot antenna in response to such electrical signals. In some embodiments, the device can include an antenna matching circuit to achieve a targeted antenna impedance. This may improve RF system transmission and reception. The antenna matching circuit design can be included on the PCB 140. The antenna matching circuit can be configured to connect the feed clip 142 to an RF engine chipset on the PCB 140. The feed clip 142 may also be provided by structures other than that shown, e.g., by a bonded wire, spring contact pin, a combination of such features or other features that provide for electrically-conductive contact between the monopole radiator and the printed circuit board. In some embodiments, the monopole radiator 124 is routed in a clockwise pattern for efficient excitation of the slot antenna mode as seen in FIG. 7. In certain embodiments, the monopole radiator 124 performs better when placed closer to the display window (not shown). There are a number of technologies that can be used to implement the monopole antenna 120 including, but not limited to, laser designated structure (LDS), 2-shot plated, stamped sheet metal, printed antenna, and the like.

The PCB 140 can be grounded to the metal housing 105 at grounding points, e.g., grounding screws. In some embodiments, copper layers can be removed from the PCB 140 to improve performance by reducing the capacitive coupling between the PCB and the metal housing 105.

Figure 10A:
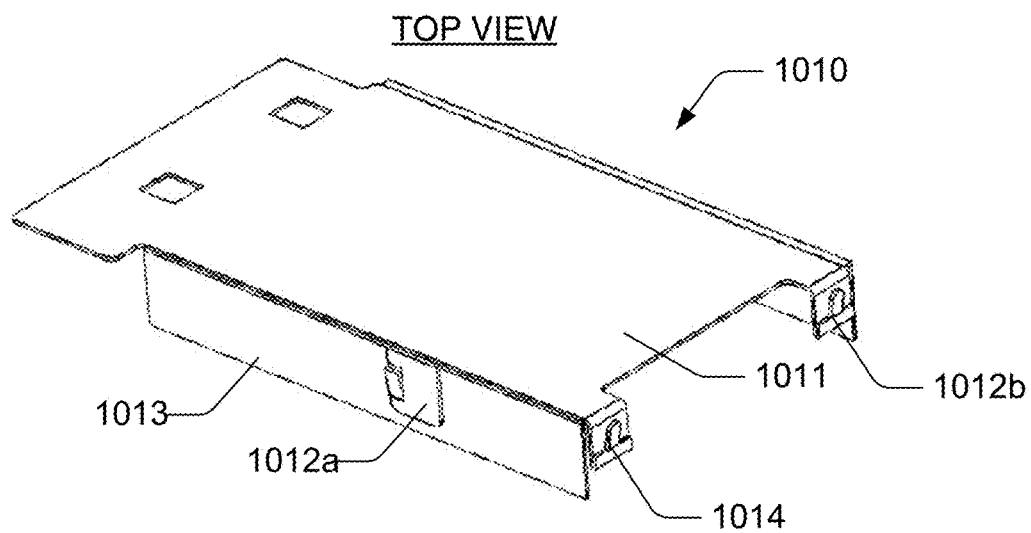
FIGS. 10A-10B illustrate another example embodiment of a metal plate configured to form a slot antenna within a metal housing.
Figure 10B:
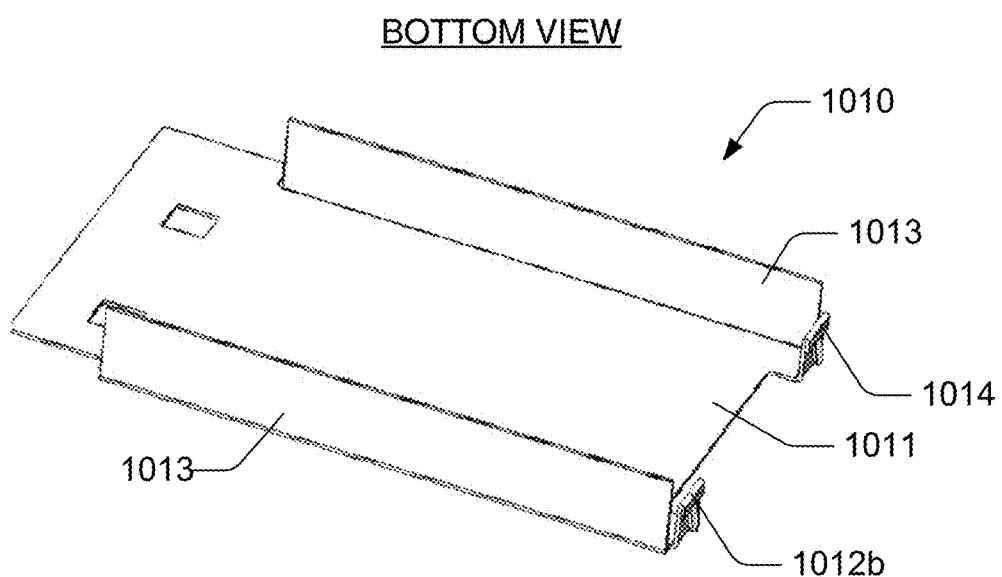

FIGS. 10A-10B illustrate another example embodiment of a metal bracket 1010 configured to form a slot antenna within a metal housing. The metal bracket 1010 can include a metal frame with vertical walls 1013 configured to contain or secure the battery in place and/or to control the radiating slot width. The metal bracket 1010 includes a main plate 1011 and side walls 1013 with grounding clips 1012a, 1012b, 1014.

A thin dielectric spacer can also be used at both side gaps between the metal housing side wall and the metal bracket 1010 to control the variation in radiating slot width. The dielectric spacer can be a well-controlled material that is non-conducting, low RF loss, rigid, and capable of holding its thickness. In some embodiments, a plastic film with controlled thickness can be used with a pressure or spring fit to control spacing. In certain embodiments, tape can be used with the metal bracket 1010 with spring fingers to control spacing.

Figure 11:
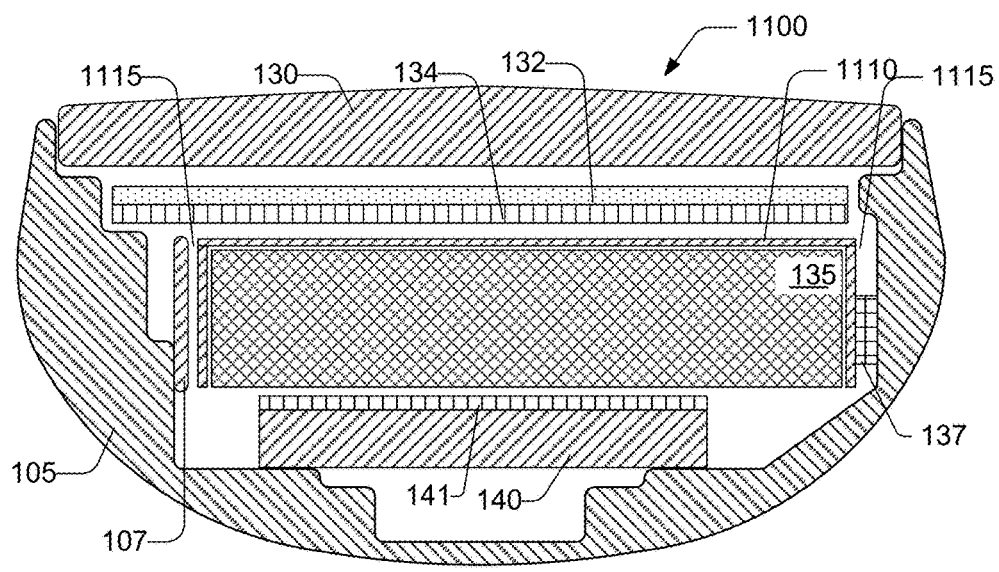
FIG. 11 illustrates a cross-section of an example wearable electronic device having a metal plate configured similarly to the metal plate of FIGS. 10A-10B.

FIG. 11 illustrates a cross-section of an example wearable electronic device 1100 having a metal bracket 1110 configured similarly to the metal bracket 1010 of FIGS. 10A-10B. In other respects, the device 1100 is similar to the device 100 described herein with reference to FIGS. 1-9, except that the metal plate 1110 includes side walls that extend along the sides of the battery 135 to control the gap width of the slot antenna 1115.

Figure 12A:
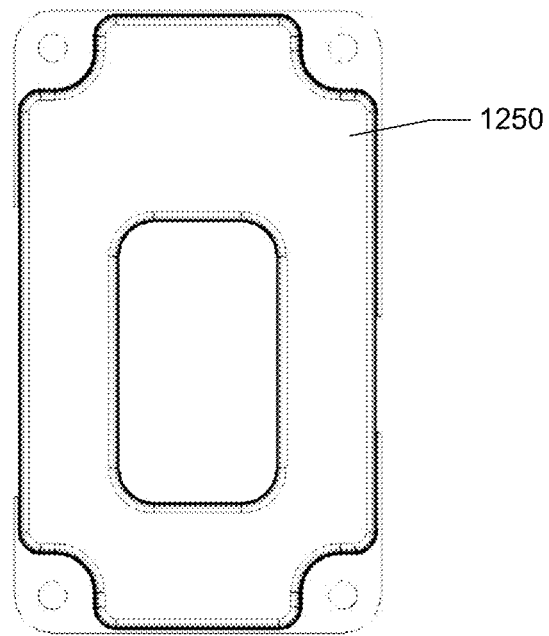
FIG. 12A illustrates an example plastic bracket to secure the battery in place within a metal housing.

FIG. 12A illustrates an example plastic bracket 1250 to secure the battery in place within a metal housing. The plastic bracket 1250 can be positioned between the battery 135 and the component layer of the PCB 141. The plastic bracket 1250 can be made of a polycarbonate plastic or other similar material.

Figure 12B:
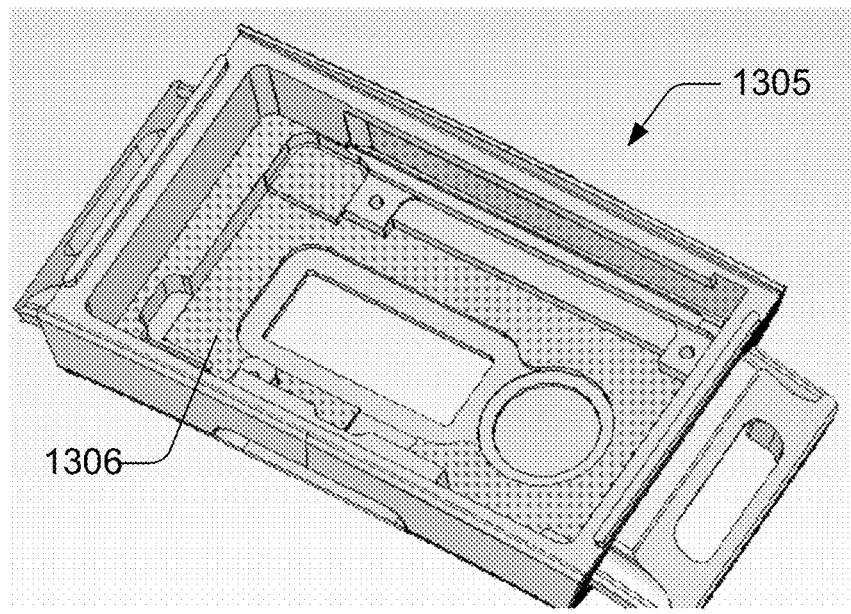
FIG. 12B illustrates an example metal housing of a wearable electronic device with a slot antenna as described herein.

FIG. 12B illustrates an example metal housing 1305 of a wearable electronic device with a slot antenna as described herein. The cavity formed by the metal housing 1305 can provide a volume for components of the electronic device. Generally, the larger the cavity volume, the better antenna efficiency is expected. However, smaller devices may be generally preferred for particular applications, such as biometric monitoring devices for use during fitness activities. In some embodiments, the surfaces 1306 of the metal housing 1305 capacitively couple to the battery and other PCB components. It is advantageous to use one or more features described herein to control the spacing of the components with respect to the metal housing 1305 to avoid undesired RF shorts.

Figure 13A:
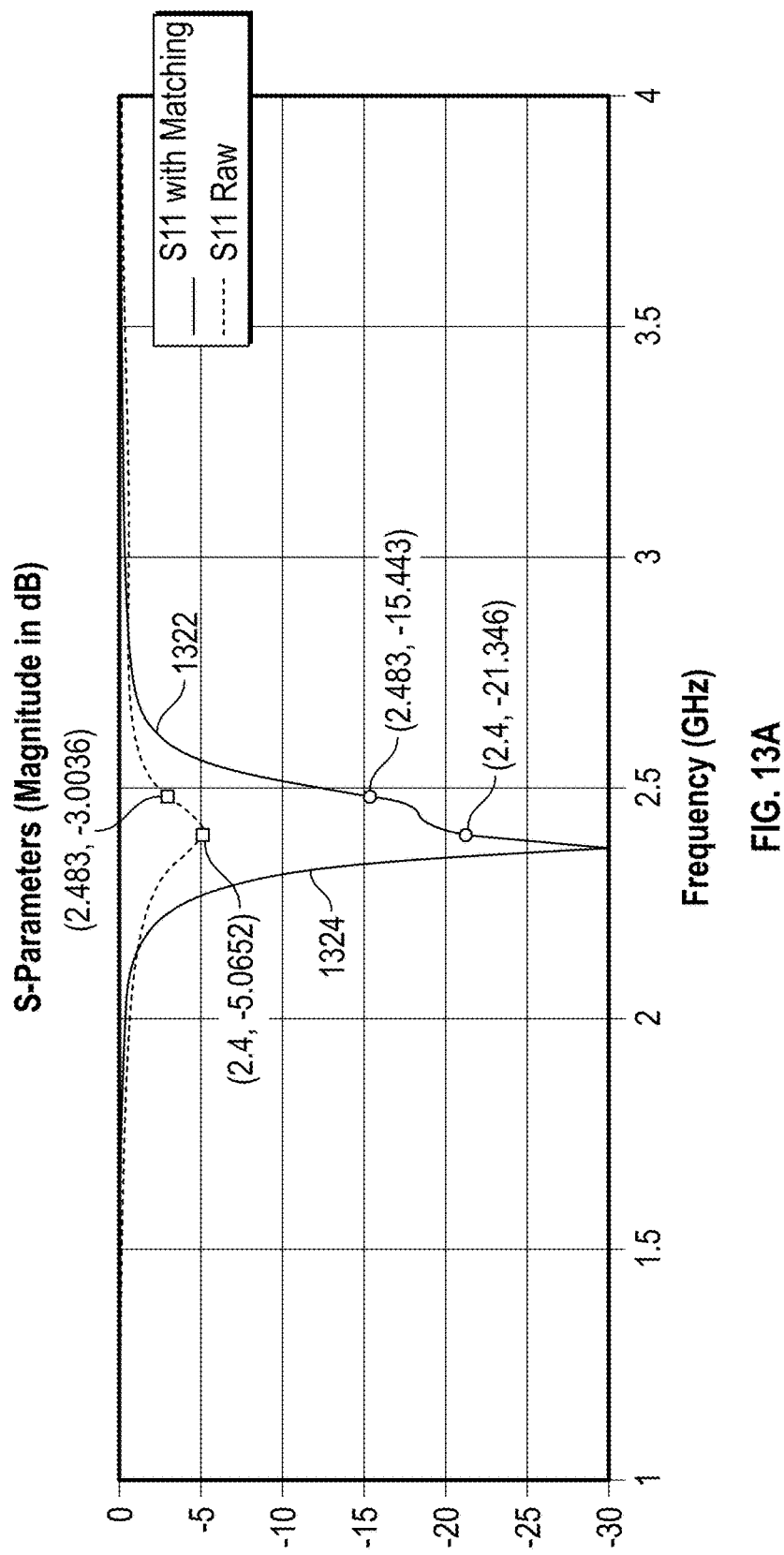
FIGS. 13A, 13B, and 13C illustrate simulation results for an example of monopole excited slot antenna design for wearable electronic device.
Figure 13B:
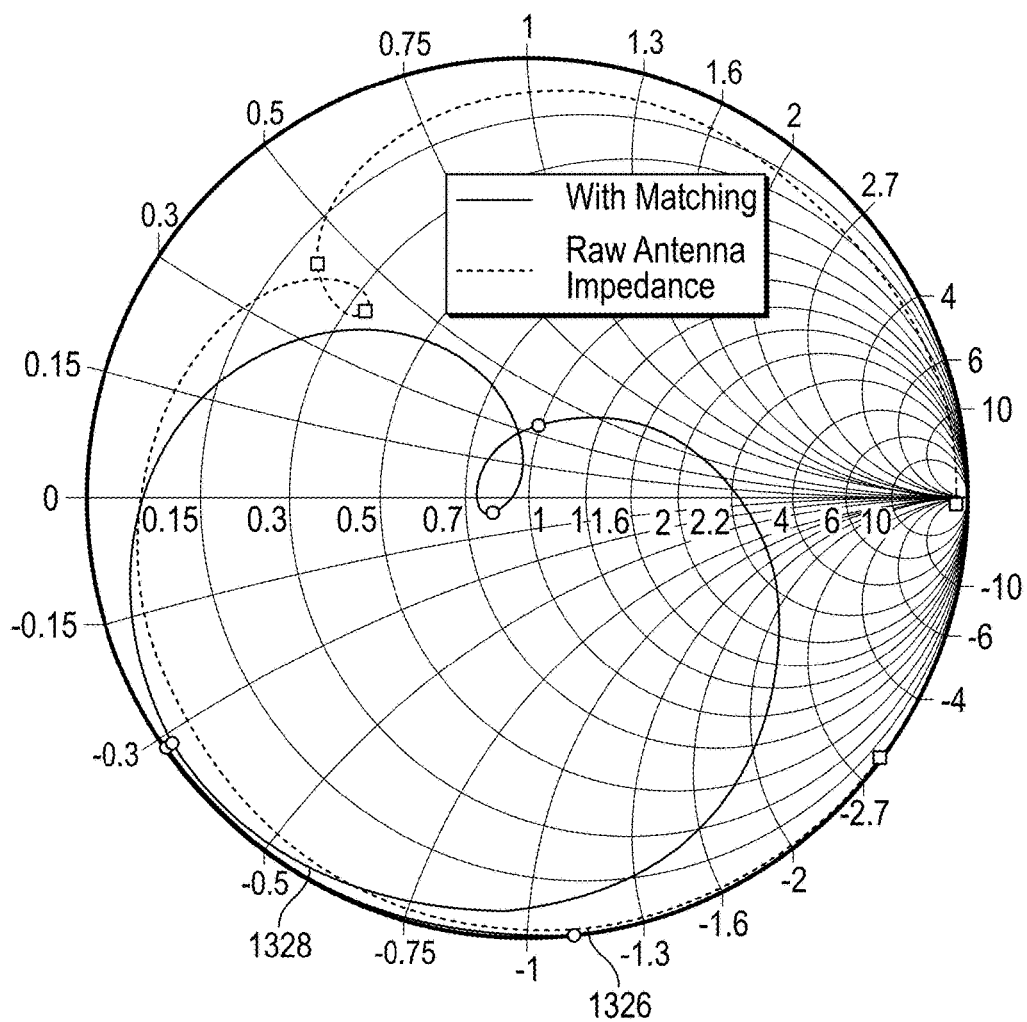
Figure 13C:
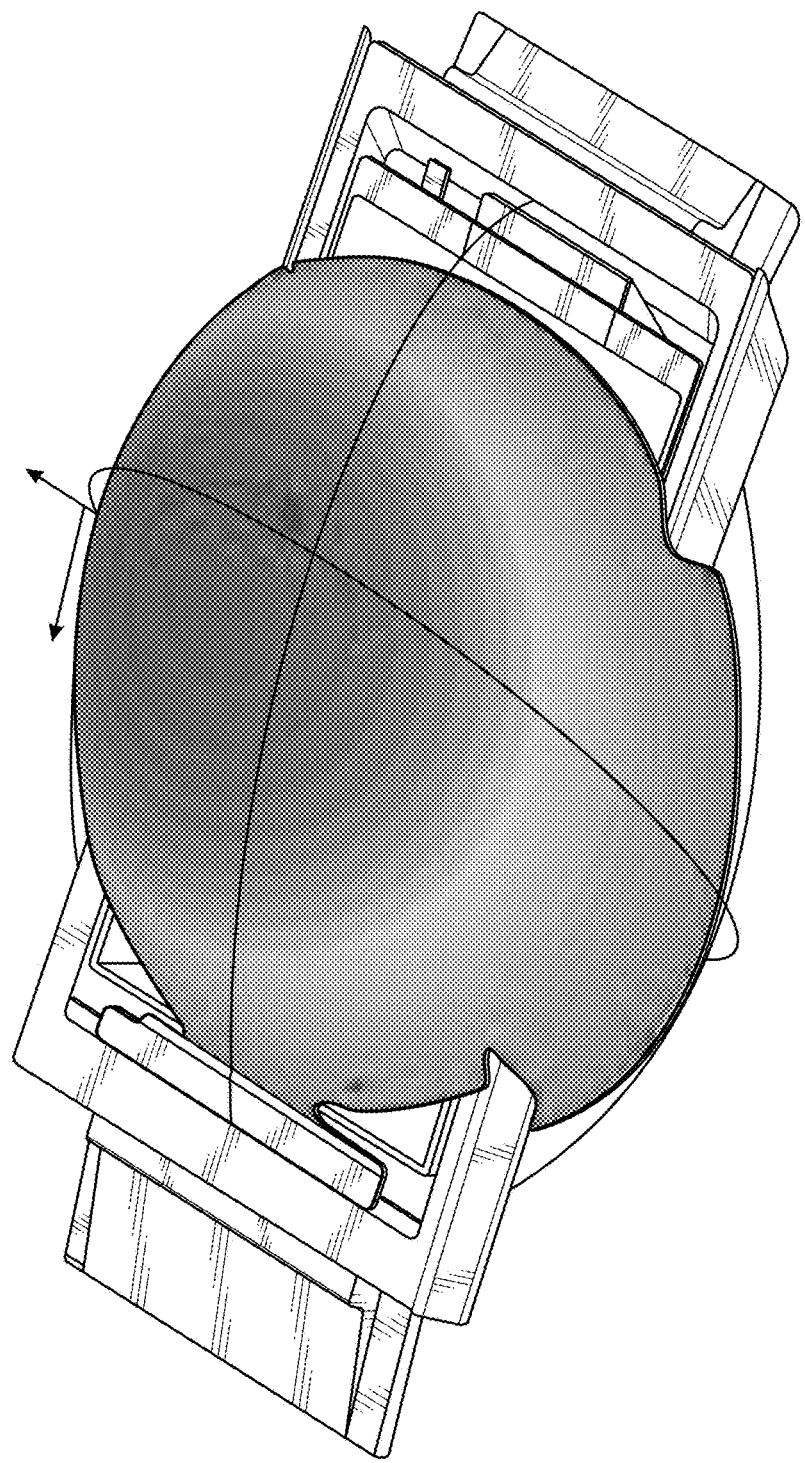

FIGS. 13A, 13B, and 13C illustrate simulation results for an example excited slot antenna for wearable electronic device. FIG. 13A illustrates simulation results for S-parameter, S11, over frequency for configurations including a matching circuit and raw antenna impedance (e.g. excluding the matching circuit). Simulation results indicate that this design would achieve S11 better than −15 dB in the BLUETOOTH® 2.4 GHz frequency band. FIG. 13B illustrates the simulated antenna impedance in a smith chart of the raw antenna (e.g. no matching circuit) and the antenna with the matching circuit included. FIG. 13C illustrates the simulated antenna radiation pattern which has a main beam whose direction is perpendicular to the display window 130 of the wearable electronic device. Furthermore, the metal housing 105 shields the user's wrist from the antenna and reduces the electromagnetic energy that is radiated in toward the user's wrist. The antenna impedance and antenna efficiency were observed to change minimally between free space and wrist worn user cases.

Example Wearable Electronic Devices with Direct Feed Slot Antenna

Figure 14A:
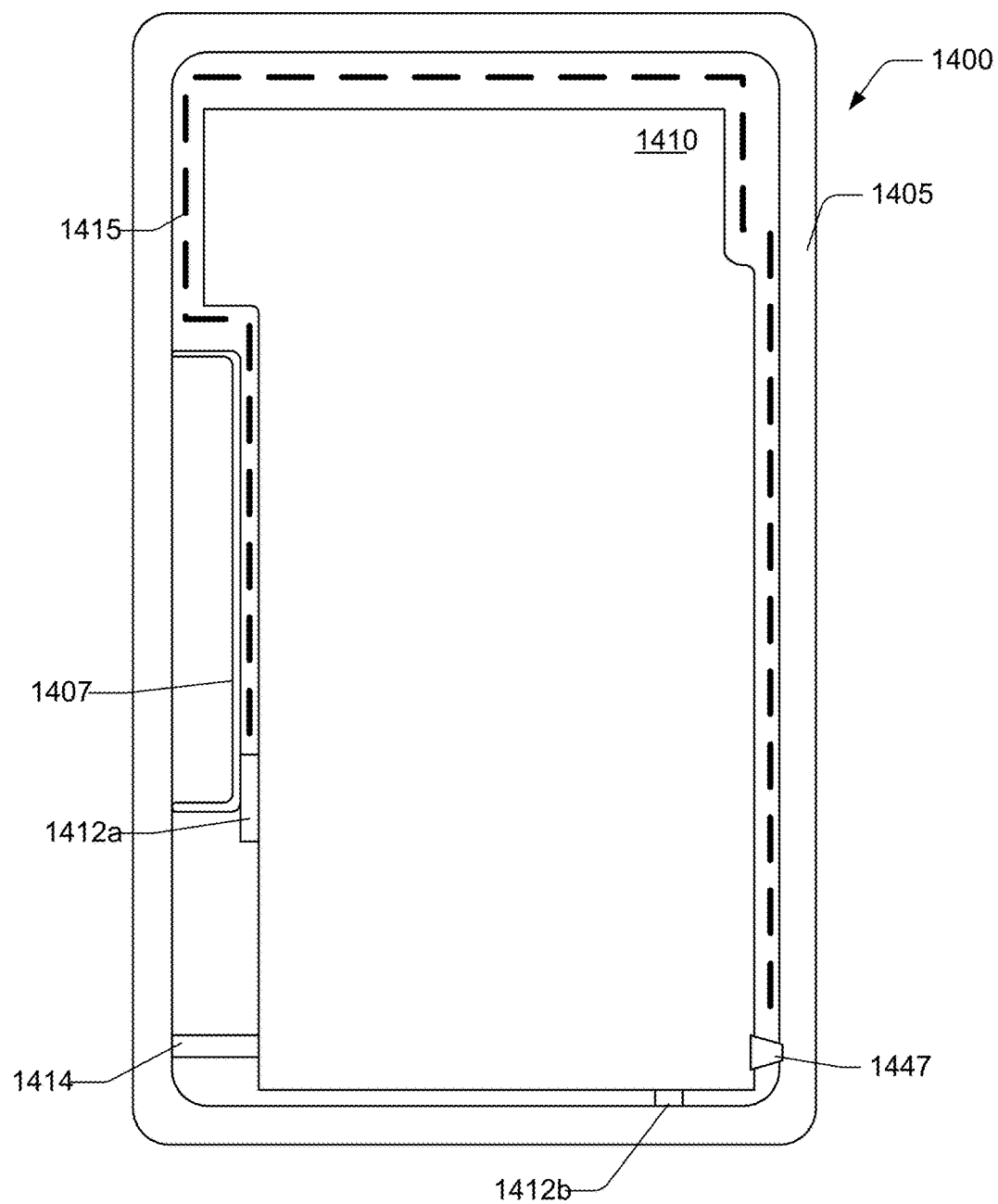
FIGS. 14A and 14B illustrate a top view and a cross-section of another example wearable electronic device having a metal plate within a metal housing forming a slot antenna that is excited by a direct feed from a printed circuit board.
Figure 14B:
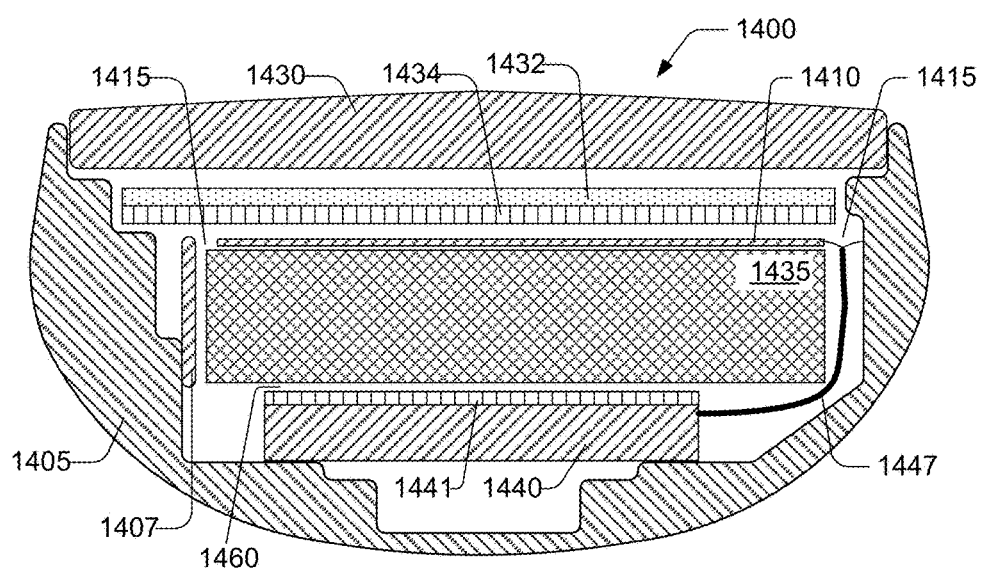
Figure 15A:
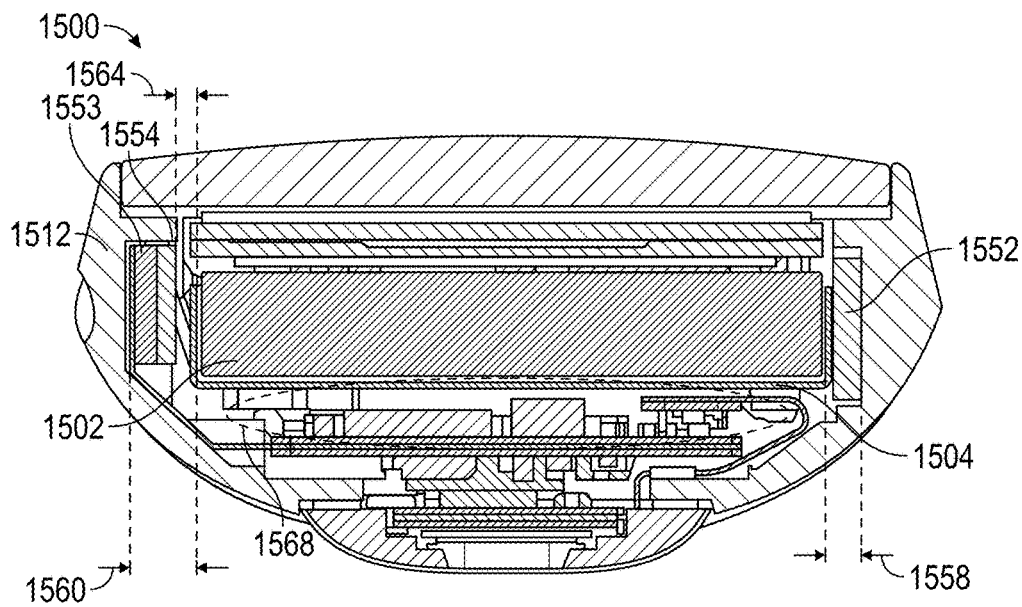
FIGS. 15A, 15B, 15C, and 15D respectively illustrate a cross-section along the width, top view, a perspective view, and cross-section along the length of another example wearable electronic device having a metal bracket within a metal housing forming a slot antenna that can be excited by a monopole antenna and the back cavity (dielectric gap) is between the printed circuit board and the metal bracket.
Figure 15B:
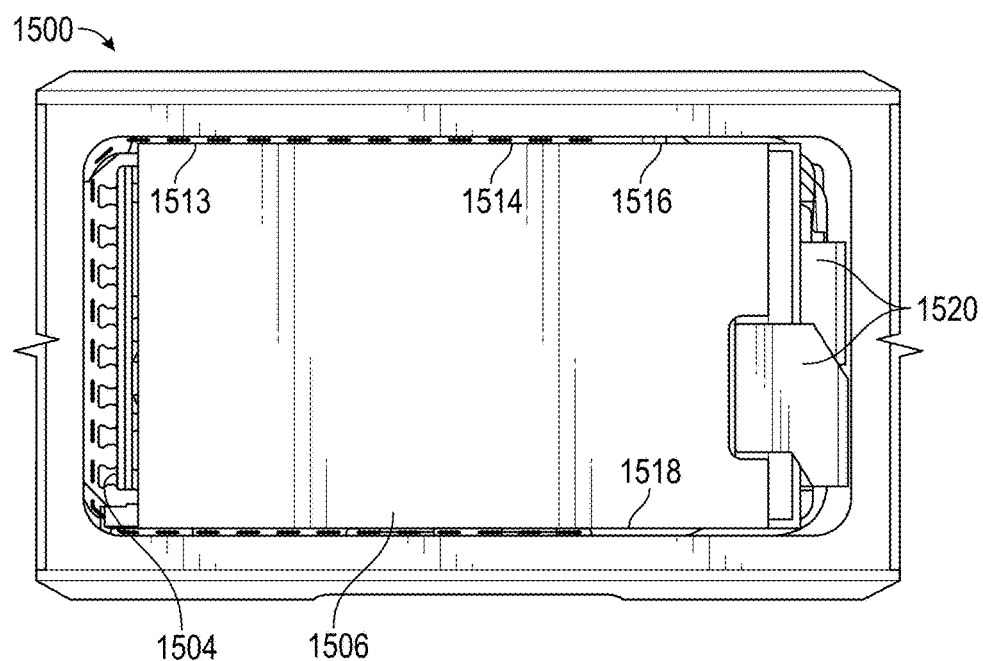
Figure 15C:
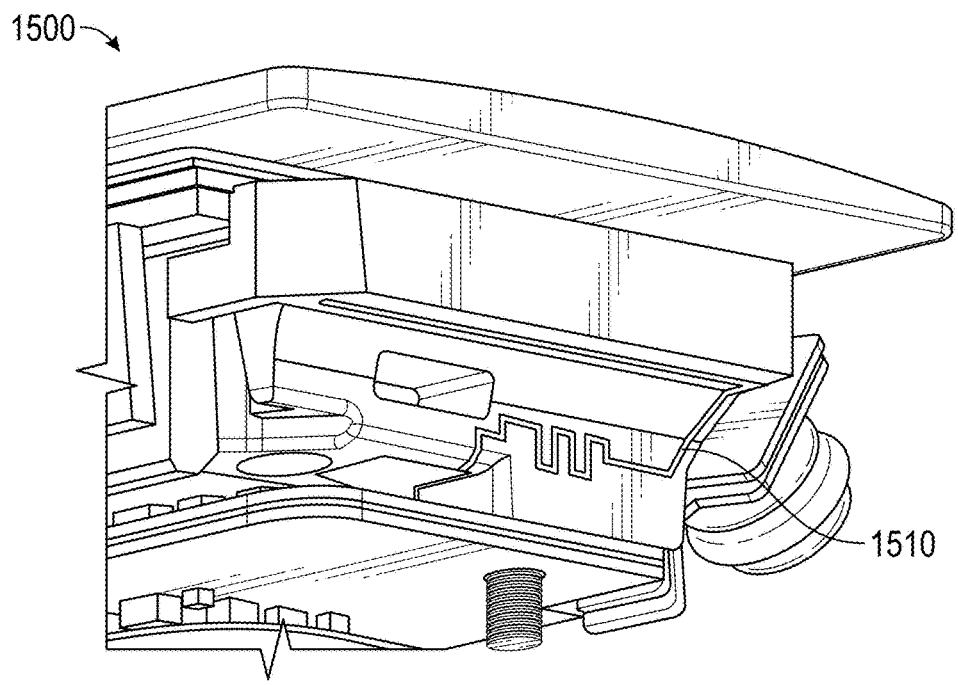
Figure 15D:
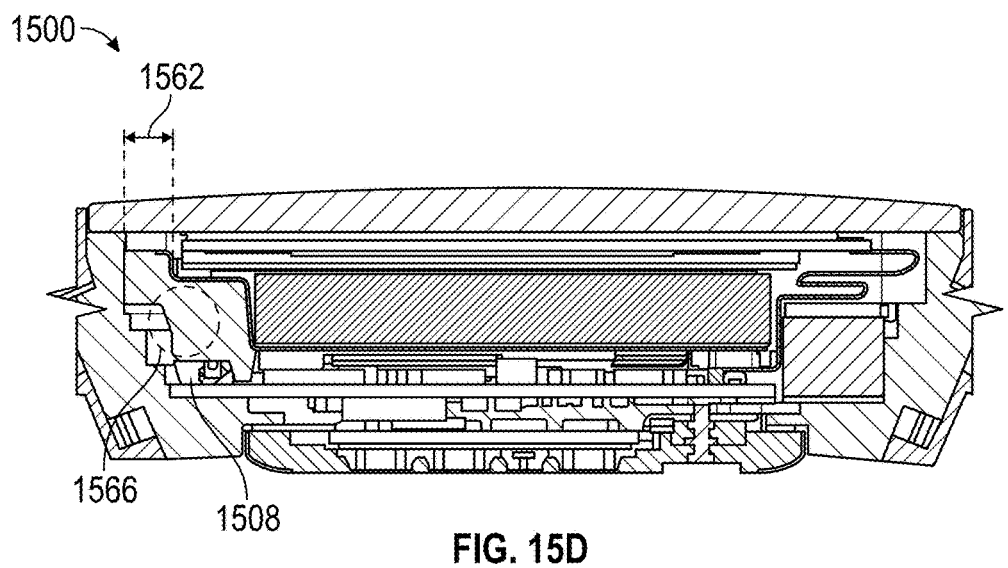

FIGS. 14A and 14B respectively illustrate a top view and a cross-section along the width of another example wearable electronic device 1400 having a metal plate 1410 within a metal housing 1405 forming a slot antenna 1415 that is excited by a direct feed 1447 from a printed circuit board 1440. The direct feed 1447 can be implemented using a coaxial cable or other transmission line to elevate the feed 1447 from the PCB 1440 to the metal plate 1410. The feed 1447 can include two or more wires or electrical conductors, one (e.g. the RF feed) being coupled to the metal plate 1410 and the other (e.g. ground) being coupled to the metal housing 1405. In some embodiments, the feed 1447 is a coaxial cable with the outer conductor (e.g., braided shield) being electrically coupled to the metal plate 1410 and the inner conductor being electrically coupled to the metal housing 1405. The metal plate 1410 can include two or more grounding pins or grounding connections that electrically couple the metal plate 1410 to the metal housing 1405 at targeted locations to define the length of the slot antenna 1415 and/or to improve performance (e.g., by reducing undesired resonances in the metal plate 1410). The back cavity (and/or the dielectric gap) 1460 can be an area below the battery 1435 and above the PCB 1440 and component layer of the PCB 1441.

To achieve targeted or desirable performance characteristics, it is beneficial to position the metal plate 1410 near the display window 1430 of the device 1400. The direct feed 1447 allows the metal plate 1410 to be positioned high within the metal housing 1405 while still allowing the PCB 1440 to be placed below the battery 1435. This advantageously allows the battery 1435 to be larger than configurations where the PCB 1440 is above the battery 1435. Although the slot antenna 1415 with direct feed 1447 may increase complexity and cost relative to the monopole-excited slot antennas described herein, the device 1400 can provide similar RF communication performance while providing similar advantages to the monopole-excited slot antenna architecture, such as reduced dead band and water resistance.

Example Wearable Electronic Devices with Monopole Excited Slot Antenna

In some embodiments, the metal bracket can enclose at least a portion of the battery. FIGS. 15A, 15B, 15C, and 15D respectively illustrate a cross-section along the width, top view, a perspective view, and cross-section along the length of another example wearable electronic device 1500 having a metal bracket 1504 within a metal housing 1512 forming a slot antenna 1513 that can be excited by a monopole antenna 1510. In some embodiments, the metal housing 1512 can be designed to be worn on a person's wrist. In some embodiments, the slot antenna 1513 can extend from a grounding point (e.g. a clip ground) 1514 to another grounding point (e.g. a screw ground) 1518. An additional grounding point 1516 can be used to eliminate unwanted resonances. The monopole antenna 1510 can excite the slot antenna 1513, for example, by electromagnetic field coupling.

In some embodiments, the slot antenna architecture includes a printed circuit board ("PCB") mounted close to the bottom of a metal housing. A battery can be disposed above the PCB and within the metal housing. The antenna slot can be excited by a capacitive coupled monopole antenna radiator.

In some embodiments, the monopole antenna 1510 can be placed on a plastic carrier. Advantageously, spring force to the cover glass window can be reduced and/or eliminated which can provide benefits for water resistant features. The monopole antenna 1510 can comprise a laser direct structuring antenna that can be disposed on a plastic carrier. The monopole antenna 1510 can be disposed in the dead band at the top of the display area inside the metal housing 1512. The monopole antenna 1510 can be connected through an antenna clip placed on a PCB to the radio frequency engine. The metal bracket 1504 is inserted molded into the plastic carrier for the monopole antenna 1510.

In some embodiments, the metal bracket 1504 at least partially surrounds the battery 1502. The battery 1502 can be disposed inside the surroundings of a metal bracket 1504. The display module can be disposed above the battery 1502. An NFC flex antenna can be placed on top of the battery 1502 or below the display module. A PCB can be placed below the metal plate 1504.

In some embodiments, the metal bracket 1504 can be disposed at least partially below battery 1502. The metal bracket 1504 can be disposed such that the slot gaps between the metal bracket 1504 and the metal housing 1512, and such that the back cavity gap 1568 between the metal bracket 1504 and PCB may not be affected by the size and/or swelling of the battery 1502. For example, the metal bracket 1504 can be disposed on the bottom surface of the battery 1502 and extend vertically to be adjacent to at least a portion of the side walls of the battery 1502. As such, the slot spacers 1552 and 1554 and/or the side key stiffener 1553 may not be affected by the battery tolerance, and thus, the slot gaps, such as the slot gaps 1560, 1558, 1562, 1564, and back cavities 1566 and 1568 also may not be affected by battery size tolerance. The metal bracket 1504 can be adjacent to at least a portion of the bottom of the battery 1502 and one or more side walls of the battery 1502. The metal bracket 1504 can follow the contour of the battery 1502 and/or fold according to the shape of the battery 1502 (e.g. the metal plate 1504 can fold at 90 degrees if the side wall and bottom of the battery is at 90 degrees).

In some embodiments, the slot gaps 1560, 1558, 1562, and 1564 and back cavities 1566 and 1568 can provide channels for slot antenna to radiate signals through, and as such, the effect of battery tolerance to antenna performance can be reduced and/or eliminated based on the structural design of the metal bracket 1504 and the battery 1502.

Furthermore, the back cavities 1566 and 1568 can be areas below the metal bracket 1504 and above the PCB or the metal housing 1512 where antenna electromagnetic fields resonate. As such, the back cavities 1566 and 1568 can be sensitive areas for a slot antenna design in a metal enclosure. Advantageously, such structural design can improve isolation of the metal housing 1512, the PCB, and/or the metal bracket 1504 with the back cavities 1566 and 1568. This becomes important because the electromagnetic field inside the back cavities can affect antenna performance if a metal component is disposed inside the back cavities.

Advantageously, the structural design may not be affected by battery tolerance. For example, such a structural design of the metal bracket 1504 can allow for a dynamic size for the battery. Moreover, such a structural design allows for battery swelling while reducing and/or eliminating the effect on antenna performance. For example, a battery can swell over the lifetime of its use. If the metal bracket 1504 is disposed below and/or around the battery 1502, the battery 1502 can be allowed to swell while still maintaining the same gaps between the metal bracket 1504 and the metal housing 1512 and PCB. Such a structure allows the battery to swell in height, width, and/or length while reducing and/or eliminating the impact to the antenna performance.

Figure 16A:
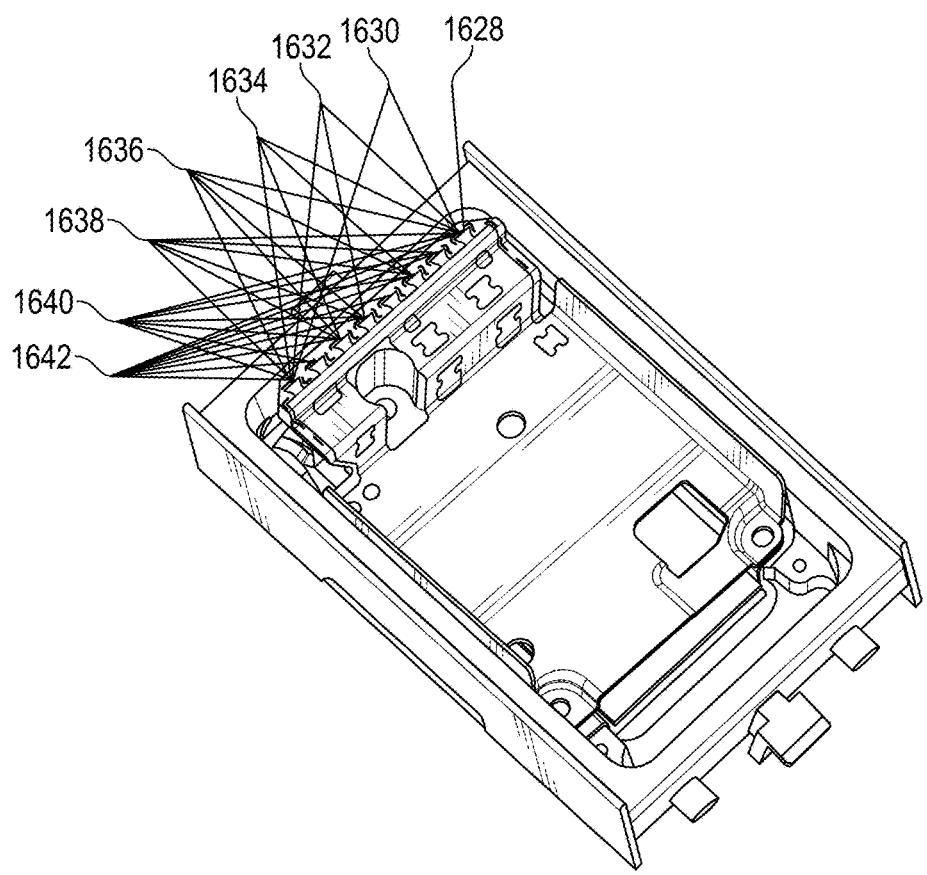
FIGS. 16A and 16B respectively illustrate example implementations of the metal bracket to facilitate antenna frequency tuning.
Figure 16B:
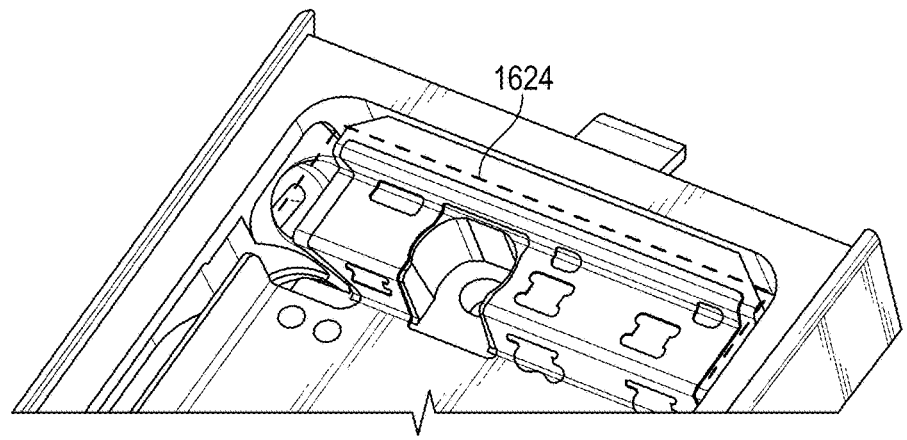

Example Wearable Electronic Devices with Frequency Tuning Based on Multiple Tab Configurations In some embodiments, a frequency tuning mechanism is provided. The frequency tuning mechanism can provide tuning of the antenna without requiring mechanical changes to the size and/or structure of the device design. FIGS. 16A and 16B respectively illustrate metal brackets to facilitate antenna frequency tuning. FIG. 16A illustrates metal brackets with an eight-tab structure. FIG. 16B illustrates metal brackets with a zero-tab structure.

In some embodiments, a wearable device includes a slot antenna that can be excited by a monopole antenna. The length of the slot antenna can follow a path within the wearable device. For example, the length of the slot antenna can follow a line that goes around eight metal tab structures. The metal tab structure(s) can provide frequency tuning with a certain resolution. Each of the teeth or tabs (or combination of tabs) can be removed to provide a frequency shift of the antenna.

In some embodiments, the tab structure can include one or more tabs. As such, the length of the slot antenna can be extended by going around each tab. In the example of FIG. 16A, the tab structure includes eight tabs. The length of the antenna slot includes the length around each tab. The slot antenna can tune the antenna resonance to a higher frequency range by trimming the tabs. This becomes advantageous because the slot antenna may need to be tuned to a certain length and a matching circuit on the PCB may be required in order to properly tune the antenna impedance.

In some embodiments, one or more tabs can be removed from the tab structure. For example, the tab structure of FIG. 16A can initially begin with eight tabs. One or more tabs can be removed by a trimming and/or cutting tool. Advantageously, the tab structure allows for quick frequency tuning by simply trimming one or more tabs. This can be advantageous in the development phase and/or for custom designs. Furthermore, such frequency tuning may not require tooling design changes or fixture changes. Such a tab structure provides flexibility in optimizing antenna performance while creating a mechanical interlock structure for insert molding. The tab structure can prevent the bracket from delaminating and/or separating from the insert molded plastic. The tapered tab structure and/or coined edges at the end of one or more tabs can provide interlocking functionality. Furthermore, the tab structure can allow for frequency tuning with minimal and/or external structural design changes to the device.

Figure 17:
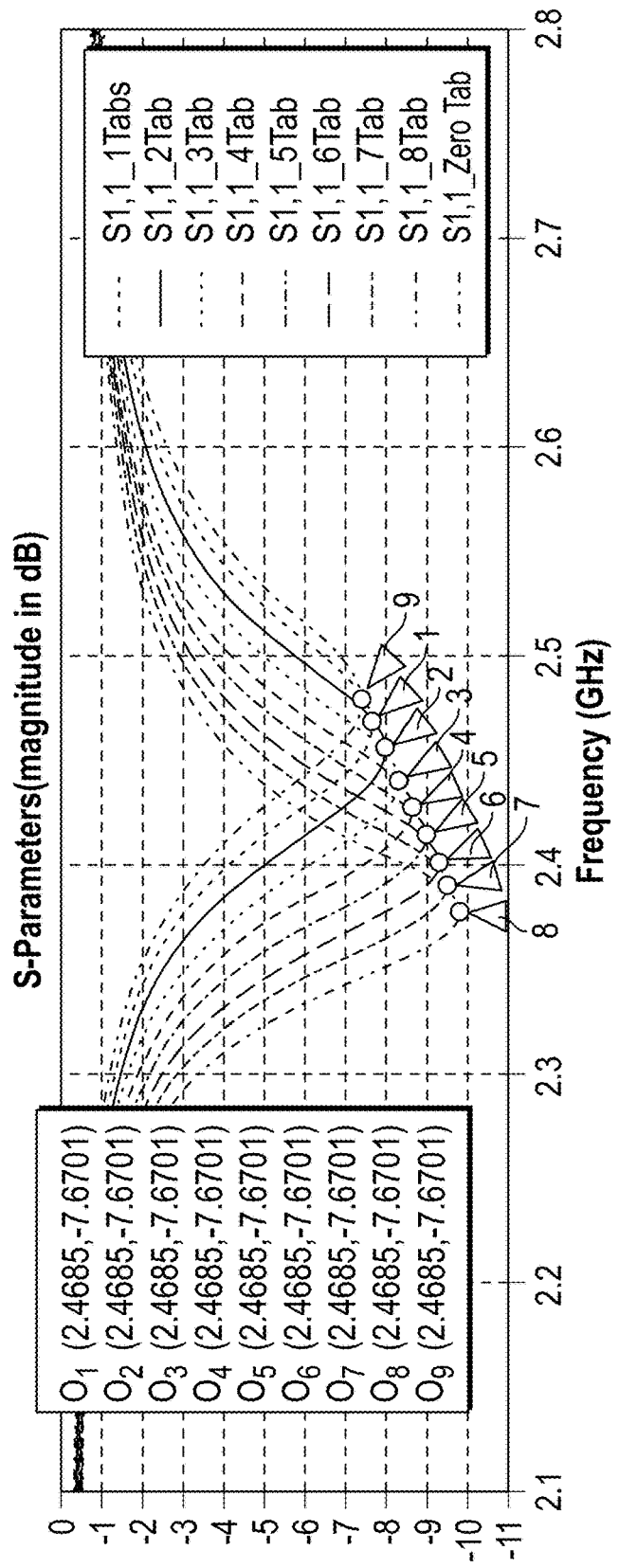
FIG. 17 illustrates simulation results of return loss for a number of tab configurations.

In some embodiments, the tab structure includes an eight-tab configuration 1642. One or more tabs can be trimmed off creating a seven-tab configuration 1640, a six-tab configuration 1638, a five-tab configuration 1636, a four-tab configuration 1634, a three-tab configuration 1632, a two-tab configuration 1630, and/or a single tab configuration 1628. FIG. 16B illustrates a structure where all tabs have been trimmed off. FIG. 17 illustrates simulation results of S-parameter, S11, for a number of tab configurations. For example, line 1 represents a single tab configuration, line 2 represents a two-tab configuration, line 3 represents a three-tab configuration, line 4 represents a four-tab configuration, line 5 represents a five-tab configuration, line 6 represents a six-tab configuration, line 7 represents a seven-tab configuration, line 8 represents an eight-tab configuration, and line 9 represents a zero-tab configuration. As shown, the tuning range between an eight-tab configuration and a single tab configuration is about 104 MHz. Each tab can provide a frequency shift, such as a 13 MHz frequency shift.

Example Wearable Electronic Devices with Grounding Points to Facilitate Antenna Communications In some embodiments, grounding points between the metal bracket and metal housing define the slot length area. FIGS. 18A, 18B, 18C, 18D, and 18E illustrate three grounding points 1810, 1814 and 1812 directly in contact with the metal housing. In some embodiments, the wearable device can include a battery 1804 enclosed at least partially within a metal bracket 1806, the slot antenna 1853 including the tab configuration 1802, the slot antenna that can be excited by a monopole antenna 1808, and three grounding points 1810, 1814 and 1812.

In some embodiments, the first and second grounding points 1810 and 1814 can define the length of the slot antenna. The first and second grounding points 1810 and 1814 can be designed to be placed at certain locations to tune the slot length to resonate at the BLUETOOTH® frequency band. The third grounding point 1812 can help improve the performance of the antenna by breaking the gap structure outside the radiation slot. The third grounding point 1812 can be designed to prevent unwanted resonances in the rest of the slot area, which could interfere with the slot's radiation efficiency. The PCB can be grounded to the metal housing at the three grounding points 1816, 1814 and 1812. In some embodiments, the second and third grounding points 1814 and 1812, the PCB may not be directly connected to the metal housing but through a PCB bracket. Other grounding points can be implemented using other metal components to reduce coupling to the slot antenna.

In some embodiments, the antenna slot length can be changed by moving the first grounding point 1810. For example, the location of the first grounding point 1810 can be moved closer to grounding point 1812 which will increase the length of the slot antenna because the length of the slot antenna is defined by the first and second grounding points 1810, 1814.

Figure 18A:
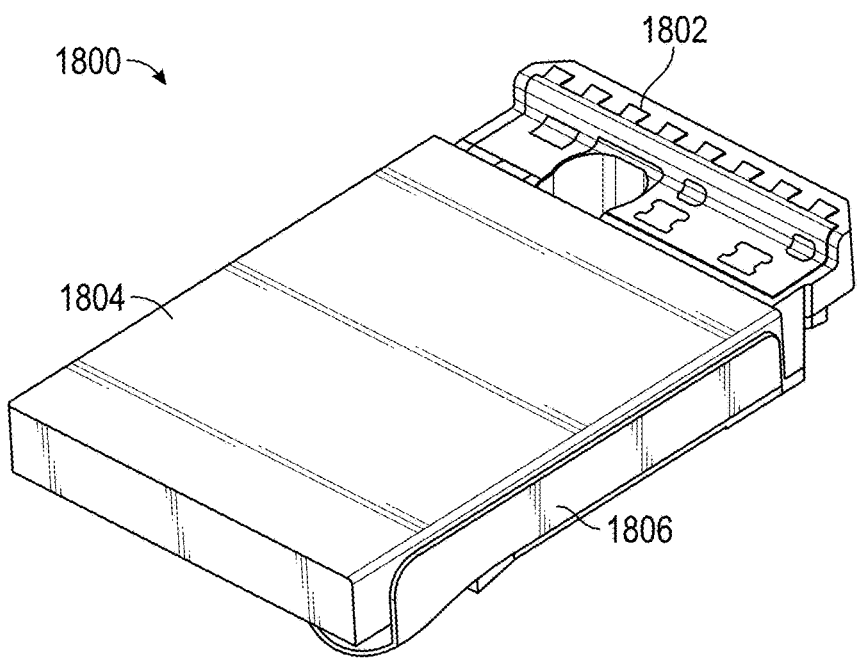
FIGS. 18A, 18B, 18C, 18D and 18E illustrate three grounding points connecting the metal bracket to the metal housing.
Figure 18B:
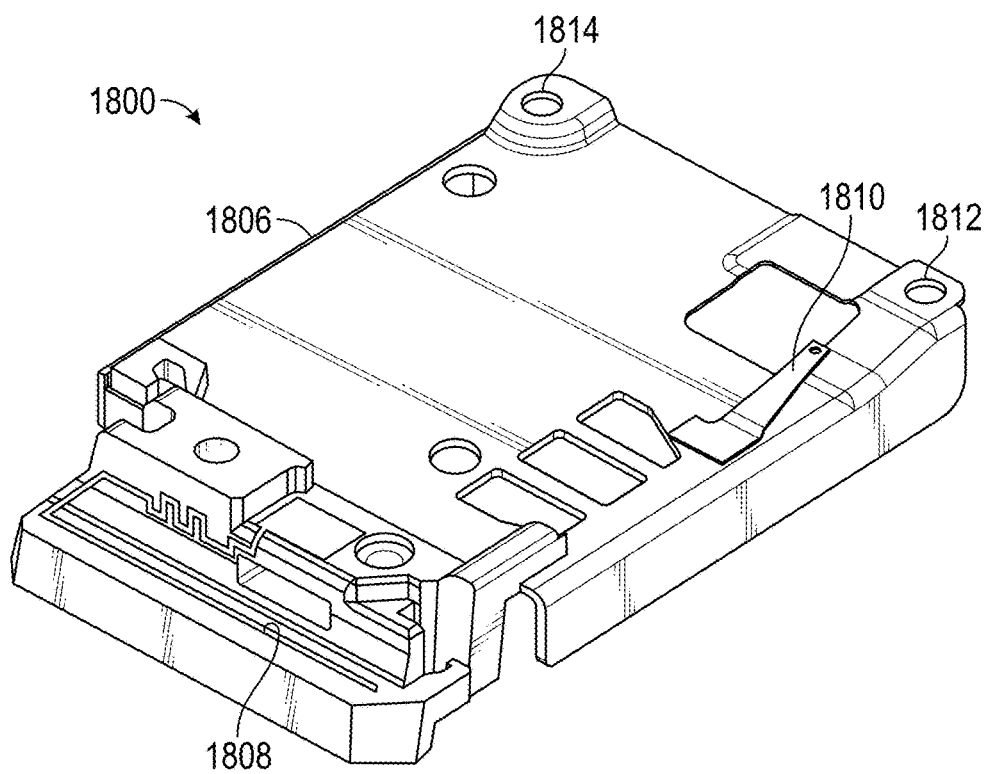
Figure 18C:
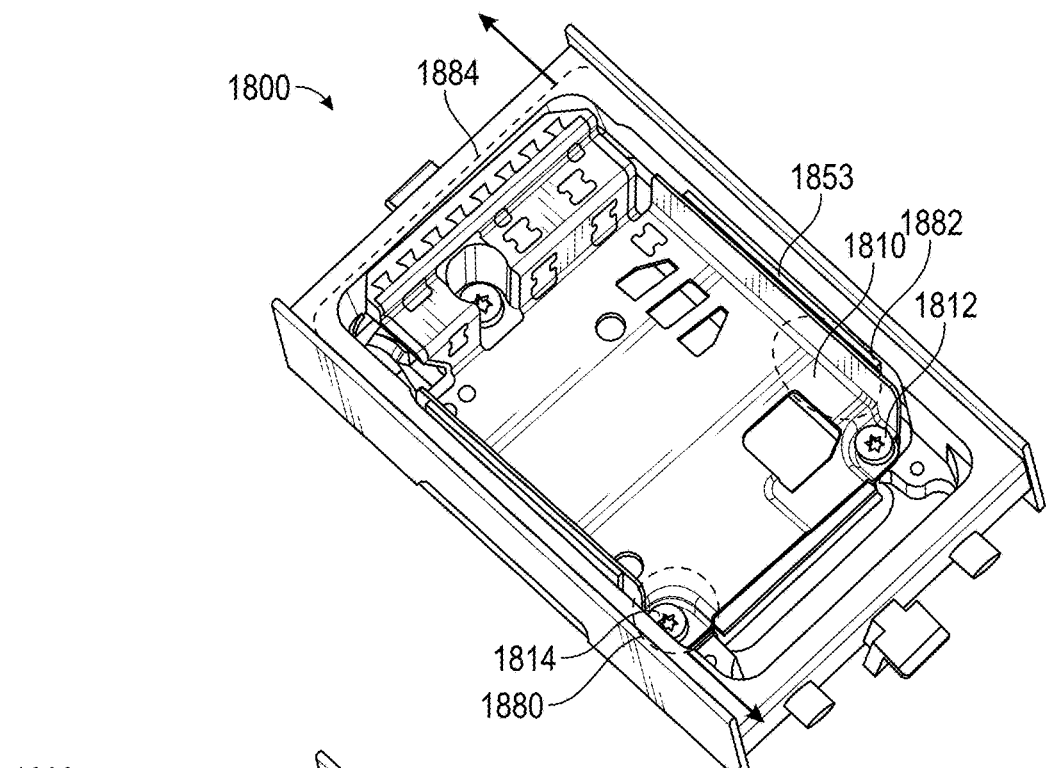
Figure 18D:
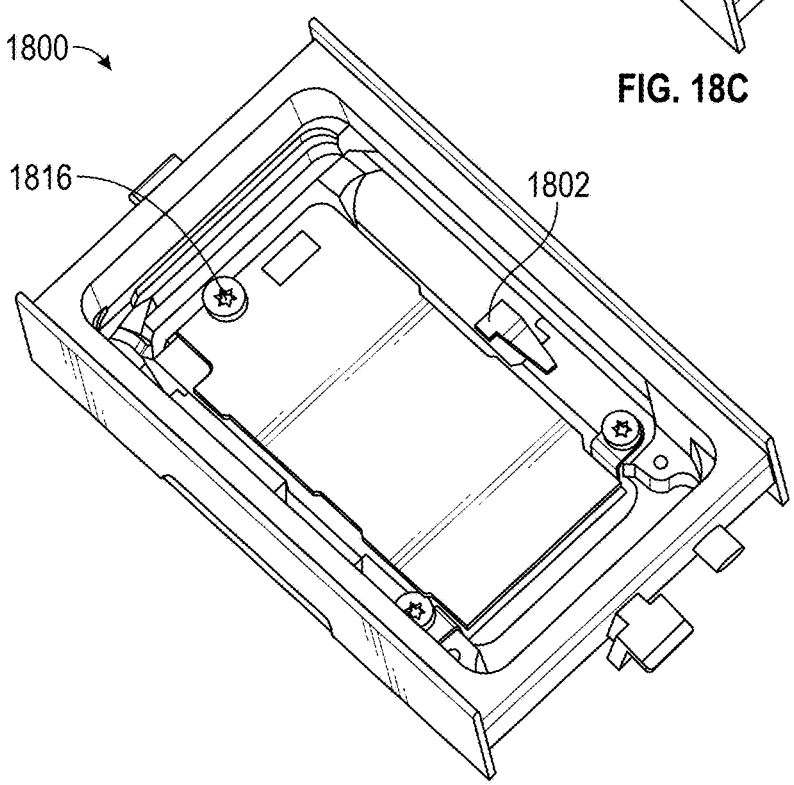
Figure 18E:
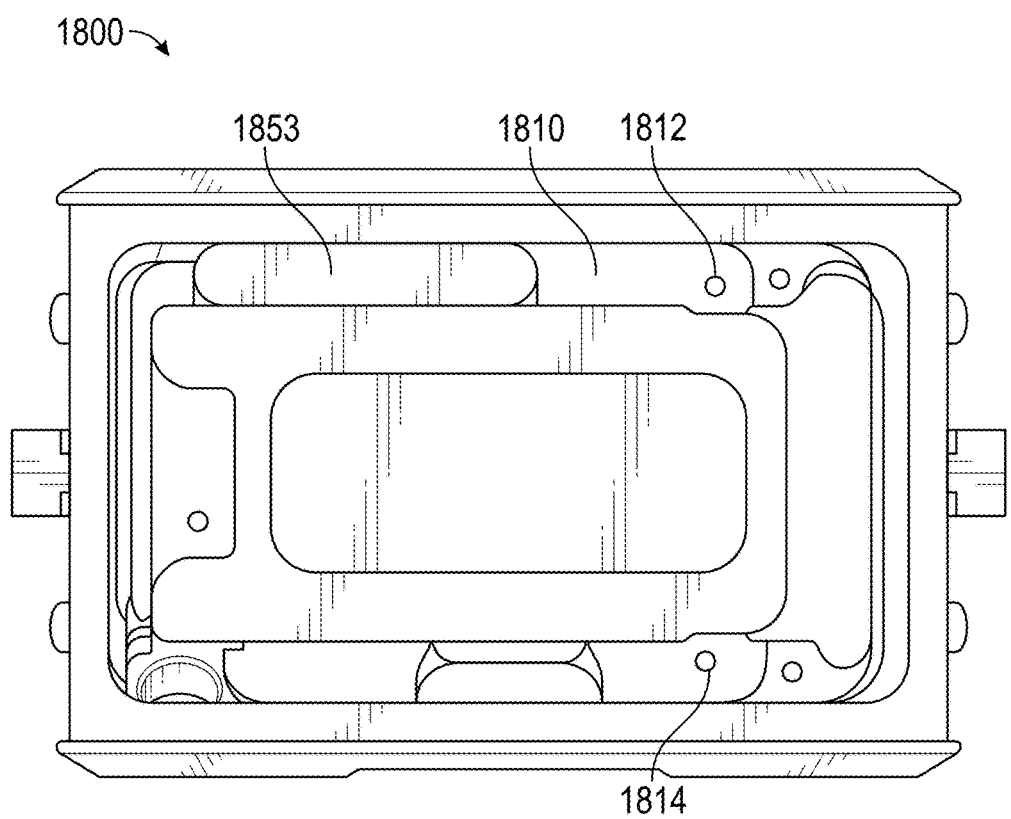

In some embodiments, the welding clip associated with the first grounding point 1810 can be removed to adjust the length of the slot antenna. For example, the welding clip associated with the first grounding point 1810 can be removed 1882 as shown in FIG. 18C. Removing the welding clip associated with the first grounding point 1810 and using the screw grounding 1812 close to the clip at the other end of the slot could achieve additional length on the slot antenna.

In some embodiments, the end bracket can be moved to adjust the length of the slot antenna. For example, the end bracket can be extended closer to the top of the wearable device 1884 as shown in FIG. 18C. Because the length of the slot antenna can be the distance between the first grounding point 1810 and the second grounding point 1814, extending the end bracket towards the end of the device 1884 can achieve a longer length of the slot antenna. In some embodiments, the end bracket can be shortened (moved away from the end of the device 1884) to achieve a shorter length of the slot antenna.

Figure 19:
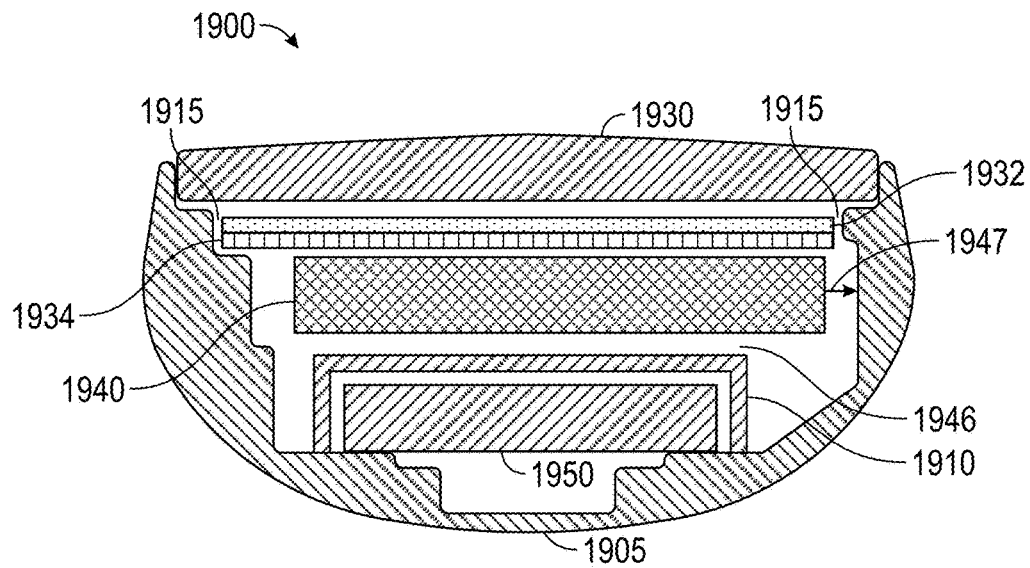
FIG. 19 illustrates a cross-section along the width of another example wearable electronic device having a metal bracket within a metal housing forming a slot antenna that is excited by a direct feed from a printed circuit board, where the direct feed is connected to the printed circuit board and the metal housing and the back cavity (dielectric gap) is between the printed circuit board and the metal bracket.

Example Wearable Electronic Devices with Direct Feed Slot Antenna from PCB to Metal Housing FIG. 19 illustrate a cross-section along the width of another example wearable electronic device 1900 having a metal bracket 1910 within a metal housing 1905 forming a slot antenna 1915 that is excited by a direct feed 1947 from a printed circuit board 1940, where the direct feed 1947 is connected to the printed circuit board 1940 and the metal housing 1905 and the back cavity (dielectric gap) 1946 is between the printed circuit board 1940 and metal bracket 1910. The direct feed 1947 can be implemented using a spring clip or pogo pin to connect the feed 1947 from the PCB 1940 to the metal housing 1905. The printed circuit board 1940 can be positioned within the metal housing 1905. For example, the printed circuit board 1940 can be positioned above the metal bracket 1910. The metal housing 1905 can include two or more grounding pins or grounding connections that electrically couple the metal housing 1905 at targeted locations to define the length of the slot antenna 1915 at the ends of the slot antenna 1915 and/or to improve performance (e.g., by reducing unwanted resonances). The battery 1950 can be positioned below most of the metal bracket 1910.

In some embodiments, the device 1900 can include a touch module 1932 and/or a display module 1934. The touch module 1932 can be configured to detect touch input on the display window 1930. The display module 1934 can be configured to display images or information through the display window 1930.

In some embodiments, between the metal bracket 1910 and the printed circuit board 1940, there is a dielectric gap (e.g. air or plastic or combination of air and plastic) 1946. The dielectric gap can create a back cavity for the slot antenna within an enclosed metal housing design. The dielectric gap can vary in height and/or can insure isolation between the PCB 1940 and to the metal bracket 1910. The dielectric gap also can insure isolation between the PCB 1940 and to the metal housing 1905.

In device implementations where the metal housing 1905 is not tapered at the bottom, the battery 1950 can be located below the PCB 1940 and not need to be reduced in size. The efficiency of the slot antenna 1915 is generally higher when the direct feed 1947 is located closer to display window 1930.

Figure 20:
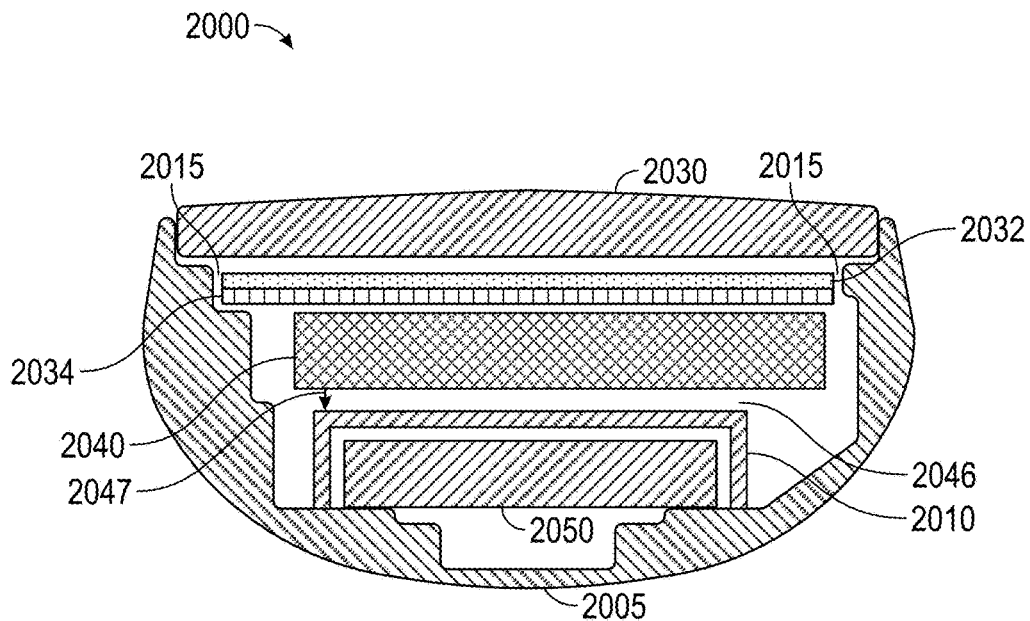
FIG. 20 illustrates a cross-section along the width of another example wearable electronic device having a metal bracket within a metal housing forming a slot antenna that is excited by a direct feed from a printed circuit board, where the direct feed is connected to the printed circuit board and the metal bracket and the back cavity (dielectric gap) is between the printed circuit board and the metal bracket.

Example Wearable Electronic Devices with Direct Feed Slot Antenna from PCB to Metal Bracket FIG. 20 illustrate a cross-section along the width of another example wearable electronic device 2000 having a metal bracket 2010 within a metal housing 2005 forming a slot antenna 2015 that is excited by a direct feed 2047 from a printed circuit board 2040, where the direct feed 2047 is connected to the printed circuit board 2040 and the metal bracket 2010 and the dielectric gap 2046 is between the printed circuit board 2040 and the metal bracket 2010. The direct feed 2047 can be implemented using a spring clip or pogo pin to connect the feed 2047 from the PCB 2040 to the metal bracket 2010. The printed circuit board 2040 can be positioned within the metal housing 2005. For example, the printed circuit board 2040 can be positioned above the metal bracket 2010. The metal housing 2005 can include two or more grounding pins or grounding connections that electrically couple the metal housing 2005 at targeted locations to define the length of the slot antenna 2015 and/or to improve performance (e.g., by reducing unwanted resonances). The battery 2050 can be positioned below most of the metal bracket 2010.

In some embodiments, the device 2000 can include a touch module 2032 and/or a display module 2034. The touch module 2032 can be configured to detect touch input on the display window 2030. The display module 2034 can be configured to display images or information through the display window 2030.

In some embodiments, between the metal bracket 2010 and the printed circuit board 2040, there is a dielectric gap (e.g. air or plastic or combination of air and plastic) 2046. The dielectric gap can create a back cavity for the slot antenna within an enclosed metal housing design. The dielectric gap can vary in height and/or can insure isolation between the PCB 2040 and to the metal bracket 2010. The dielectric gap also can insure isolation between the PCB 2040 and to the metal housing 2005.

In device implementations where the metal housing 2005 is not tapered at the bottom, the battery 2050 can be located below the PCB 2040 and not need to be reduced in size. The efficiency of the slot antenna 2015 was found to be higher than in the implementation shown in FIG. 19, possibly because there was lower current and lower loss in the connections between the metal bracket 2010 and the metal housing 2005.

Figure 21:
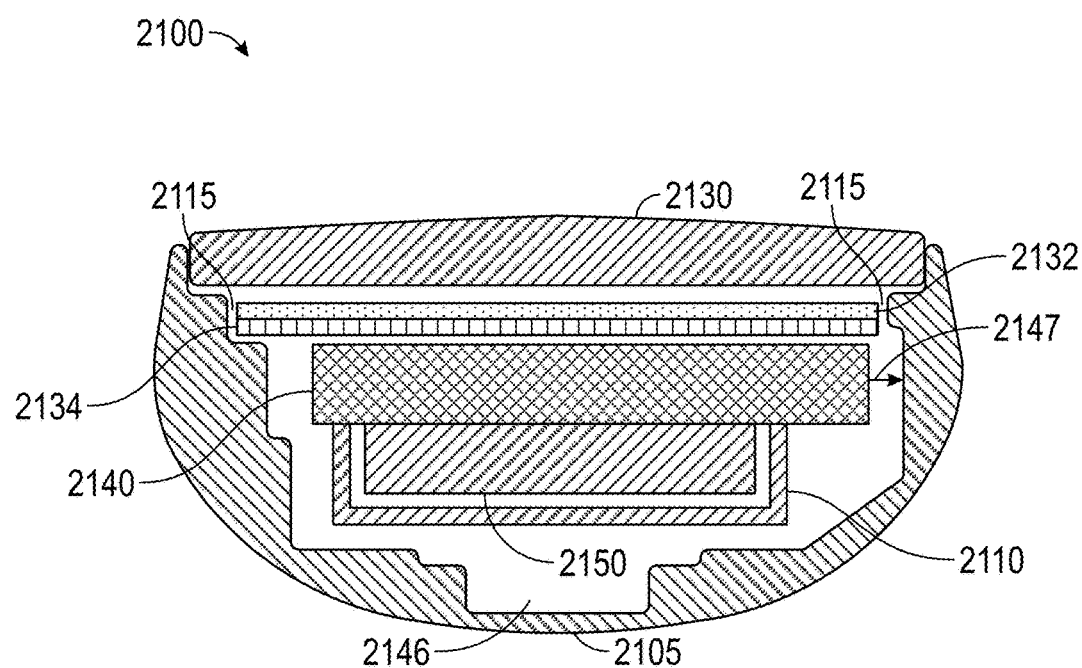
FIG. 21 illustrates a cross-section along the width of another example wearable electronic device having a metal bracket within a metal housing forming a slot antenna that is excited by a direct feed from a printed circuit board, where the direct feed is connected to the printed circuit board and the metal housing and the back cavity (dielectric gap) is between the metal bracket and the metal housing.

Example Wearable Electronic Devices with Direct Feed Slot Antenna from Printed Circuit Board to Metal Bracket with Back Cavity Below the Battery FIG. 21 illustrate a cross-section along the width of another example wearable electronic device 2100 having a metal bracket 2110 within a metal housing 2105 forming a slot antenna 2115 that is excited by a direct feed 2147 from a printed circuit board 2140, where the direct feed 2147 is connected to the printed circuit board 2140 and the metal housing 2105 and the dielectric gap 2146 is between the metal bracket 2110 and the metal housing 2105. The direct feed 2147 can be implemented using a spring clip or pogo pin to connect the feed 2147 from the PCB 2140 to the metal housing 2105. The printed circuit board 2140 can be positioned within the metal housing 2105. For example, the printed circuit board 2140 can be positioned above the metal bracket 2110. The metal housing 2105 can include two or more grounding pins or grounding connections that electrically couple the metal housing 2105 at targeted locations to define the length of the slot antenna 2115 and/or to improve performance (e.g., by reducing unwanted resonances). The battery 2150 can be positioned above most of the metal bracket 2110.

In some embodiments, the device 2100 can include a touch module 2132 and/or a display module 2134. The touch module 2132 can be configured to detect touch input on the display window 2130. The display module 2134 can be configured to display images or information through the display window 2130.

In some embodiments, between the metal bracket 2110 and the metal housing 2105, there is a dielectric gap (e.g. air or plastic or combination of air and plastic) 2146. The dielectric gap can create a back cavity for the slot antenna within an enclosed metal housing design. The dielectric gap can vary in height and/or can insure isolation between the metal bracket 2110 and to the metal housing 2105.

Additional Embodiments

Conditional language used herein, such as, among others, "can," "could," "might," "may," "e.g.," and the like, unless specifically stated otherwise, or otherwise understood within the context as used, is intended in its ordinary sense and is generally intended to convey that certain embodiments include, while other embodiments do not include, certain features, elements and/or steps. Thus, such conditional language is not generally intended to imply that features, elements and/or steps are in any way required for one or more embodiments. The terms "comprising," "including," "having," and the like are synonymous, are used in their ordinary sense, and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is understood with the context as used in general to convey that an item, term, element, etc. may be either X, Y or Z. Thus, such conjunctive language is not generally intended to imply that certain embodiments require at least one of X, at least one of Y and at least one of Z to each be present.

Reference throughout this specification to "certain embodiments" or "an embodiment" means that a particular feature, structure or characteristic described in connection with the embodiment is included in at least some embodiments. Thus, appearances of the phrases "in some embodiments" or "in an embodiment" in various places throughout this specification are not necessarily all referring to the same embodiment and may refer to one or more of the same or different embodiments. Furthermore, the particular features, structures or characteristics can be combined in any suitable manner, as would be apparent to one of ordinary skill in the art from this disclosure, in one or more embodiments.

It should be appreciated that in the above description of embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Moreover, any components, features, or steps illustrated and/or described in a particular embodiment herein can be applied to or used with any other embodiment(s). Further, no component, feature, step, or group of components, features, or steps are necessary or indispensable for each embodiment. Thus, it is intended that the scope of the inventions herein disclosed and claimed below should not be limited by the particular embodiments described above, but should be determined only by a fair reading of the claims that follow.

What is claimed is:

1. A device, comprising:
   a conductive housing having one or more interior surfaces;
   a power source;
   a conductive bracket having one or more edges or surfaces, the conductive bracket contained within and separate from the conductive housing, the one or more edges or surfaces of the conductive bracket and the one or more interior surfaces of the conductive housing forming a gap therebetween;
   a monopole antenna;
   an antenna matching circuit;
   a display within the conductive housing, wherein a dead band of the display overlaps with a dead band of the monopole antenna; and
   a printed circuit board (PCB) having one or more edges, the one or more edges of the PCB and the one or more interior surfaces of the conductive housing forming a second gap there between, a portion of the first gap forming a slot antenna, the PCB coupled to the monopole antenna through the antenna matching circuit and configured to drive a monopole radiator of the monopole antenna, wherein electromagnetic fields generated by the monopole antenna induce the slot antenna to transmit or receive radio frequency signals, further wherein the PCB and the conductive bracket form a back cavity therebetween, the back cavity comprising a dielectric gap and facilitating resonance of the slot antenna, and wherein the power source, the conductive bracket, the monopole antenna, the antenna matching circuit, and the PCB are within walls of the conductive housing.

2. The device of claim 1, wherein the dead band of the display and the dead band of the monopole antenna each include a space between an interior surface of the conductive housing and an edge or surface of the conductive bracket.

3. The device of claim 1, wherein the dead band of the monopole antenna is within the dead band of the display.

4. The device of claim 1, wherein the dead band of the monopole antenna is located within a defined distance of a top of the display.

5. The device of claim 1, wherein the slot antenna is formed at more than two edges or surfaces of the conductive bracket.

6. The device of claim 1, wherein the slot antenna is not directly excited by an antenna feed physically coupled to the PCB.

7. The device of claim 1, further comprising a near field communication antenna, wherein the near field communication antenna is above the power source within the conductive housing and below the display.

8. The device of claim 1, wherein the power source is at least partially enclosed by the conductive bracket such that a bottom surface of the power source is adjacent to a top surface of the conductive bracket and within the conductive housing, wherein the PCB is below the conductive bracket.

9. The device of claim 1, wherein the conductive bracket includes a first grounding connection at a first end of the slot antenna and a second grounding connection at a second end of the slot antenna, the first grounding connection and the second grounding connection configured to electrically couple the conductive bracket and the conductive housing.

10. The device of claim 9, wherein the conductive bracket further includes a third grounding pin across the first gap between the conductive bracket and the conductive housing, wherein the third grounding pin is not in a portion of the first gap forming the slot antenna.

11. The device of claim 1, wherein the slot antenna is completely disposed within the conductive housing, and the display is coupled to the conductive housing forming a water tight seal.

12. The device of claim 1, further comprising a touch sensor between a display window and the display.

13. The device of claim 1, wherein the PCB is grounded to the conductive housing at multiple points around a perimeter of the PCB and is proximate the bottom of the conductive housing.

14. The device of claim 1, wherein the power source is at least partially enclosed by the conductive bracket such that a top surface of the power source is adjacent to a bottom surface of the conductive bracket and within the conductive housing, wherein the PCB is below the power source.

15. A device, comprising:
    a conductive housing having one or more interior surfaces;
    a power source;
    a conductive bracket at least partially above and enclosing at least a portion of the power source such that a top surface of the power source is adjacent to a bottom surface of the conductive bracket;
    a printed circuit board (PCB) having one or more edges, the one or more edges of the PCB and the one or more interior surfaces of the conductive housing forming a gap there between, a portion of the gap forming a slot antenna, wherein the PCB and the conductive bracket form a back cavity there between, the back cavity comprising a dielectric gap and facilitating resonance of the slot antenna; and
    a direct feed coupling a matching circuit on the PCB to the conductive bracket, wherein the direct feed is configured to induce the slot antenna to transmit or receive radio frequency signals, further wherein the power source, the conductive bracket, the PCB, and the direct feed are within the conductive housing.

16. The device of claim 15, wherein the slot antenna is formed at more than two sides of the PCB.

17. The device of claim 15, further comprising a near field communication antenna, wherein the near field communication antenna is above the PCB and below a display within the conductive housing.

18. The device of claim 15, further wherein the conductive bracket is below the PCB and is grounded to the conductive housing at a plurality of locations around a perimeter of the conductive bracket and is positioned proximate the bottom of the conductive housing.

19. The device of claim 15, wherein the PCB includes a first grounding connection at a first end of the slot antenna and a second grounding connection at a second end of the slot antenna, the first grounding connection and the second grounding connection configured to electrically couple the PCB and the conductive housing.

20. The device of claim 19, wherein the PCB further includes a third grounding pin across a gap between the PCB and the conductive housing not in a portion of the gap forming the slot antenna.

* * * * *